(12) United States Patent
Schwartz et al.

(10) Patent No.: US 10,037,374 B2
(45) Date of Patent: Jul. 31, 2018

(54) MEASURING SEMANTIC AND SYNTACTIC SIMILARITY BETWEEN GRAMMARS ACCORDING TO DISTANCE METRICS FOR CLUSTERED DATA

(71) Applicant: QUALCOMM Incorporated, San Diego, CA (US)

(72) Inventors: Adam Schwartz, Beit-Shemesh (IL); Isaac David Guedalia, Beit-Shemesh (IL)

(73) Assignee: QUALCOMM Incorporated, San Diego, CA (US)

( * ) Notice: Subject to any disclaimer, the term of this patent is extended or adjusted under 35 U.S.C. 154(b) by 582 days.

(21) Appl. No.: 14/610,345

(22) Filed: Jan. 30, 2015

(65) Prior Publication Data
US 2016/0224652 A1   Aug. 4, 2016

(51) Int. Cl.
*G06F 17/30* (2006.01)
(52) U.S. Cl.
CPC .. *G06F 17/30598* (2013.01); *G06F 17/30516* (2013.01); *G06F 17/30604* (2013.01)
(58) Field of Classification Search
CPC ......... G06F 17/30516; G06F 17/30598; G06F 17/30604
USPC ........................................................ 707/738
See application file for complete search history.

(56) References Cited

U.S. PATENT DOCUMENTS

| | | | | |
|---|---|---|---|---|
| 4,479,236 A | * | 10/1984 | Sakoe | G10L 15/12 382/190 |
| 5,267,158 A | * | 11/1993 | Sakaguchi | F16H 61/143 477/174 |
| 5,305,425 A | * | 4/1994 | Ishida | G06N 7/026 706/52 |
| 6,449,589 B1 | * | 9/2002 | Moore | G06F 17/271 704/257 |
| 7,356,462 B2 | | 4/2008 | Bangalore et al. | |
| 7,689,418 B2 | | 3/2010 | Ramaswamy et al. | |

(Continued)

OTHER PUBLICATIONS

Jiang Y., et al., "Towards reengineering web sites to web-services providers", Software Maintenance and Reengineering, 2004. CSMR 2004. Proceedings. Eighth European Conference on Tampere, Finland Mar. 24-26, 2004, Piscataway, NJ, USA,IEEE, Mar. 24, 2004 (Mar. 24, 2004), pp. 296-305, XP010692157.

(Continued)

*Primary Examiner* — Phong H Nguyen
(74) *Attorney, Agent, or Firm* — Muncy, Geissler, Olds & Lowe, P.C.

(57) ABSTRACT

The disclosure relates to various distance metrics that may quantify semantic and syntactic relationships between devices. More particularly, a first grammar associated with a first device and a second grammar associated with a second device may each comprise a symbol sequence that re-expresses one or more sequenced data items and one or more rules that represent a repeated pattern in the symbol sequence. Accordingly, one or more distance metrics that quantify a similarity between the first grammar and the second grammar may be calculated according to a comparison between the rules in the first grammar and the rules in the second grammar such that a relationship between the first device and the second device can be determined according to the one or more distance metrics.

30 Claims, 10 Drawing Sheets

(56) References Cited

U.S. PATENT DOCUMENTS

| | | | |
|---|---|---|---|
| 8,077,984 B2* | 12/2011 | Cancedda | G06K 9/627 |
| | | | 382/290 |
| 8,145,474 B1 | 3/2012 | Daily et al. | |
| 8,214,398 B1 | 7/2012 | Cowan et al. | |
| 8,245,301 B2* | 8/2012 | Evans | G06F 21/552 |
| | | | 726/22 |
| 8,442,812 B2 | 5/2013 | Ehsani et al. | |
| 8,551,186 B1 | 10/2013 | Strand | |
| 8,630,965 B2 | 1/2014 | Savvides et al. | |
| 8,688,980 B2 | 4/2014 | Davis et al. | |
| 8,972,325 B2 | 3/2015 | Varghese | |
| 9,220,011 B1 | 12/2015 | Annan et al. | |
| 2004/0044868 A1* | 3/2004 | Guerrero | H04L 45/7457 |
| | | | 711/164 |
| 2005/0097364 A1 | 5/2005 | Edeki et al. | |
| 2007/0005990 A1 | 1/2007 | Sathish | |
| 2007/0113270 A1 | 5/2007 | Kraemer et al. | |
| 2007/0180516 A1 | 8/2007 | Aoki et al. | |
| 2007/0255818 A1 | 11/2007 | Tanzer et al. | |
| 2007/0271586 A1* | 11/2007 | Alperin | H04N 7/17336 |
| | | | 725/109 |
| 2008/0188236 A1* | 8/2008 | Alles | G01S 5/021 |
| | | | 455/456.1 |
| 2008/0320539 A1 | 12/2008 | Ohkita | |
| 2009/0175545 A1* | 7/2009 | Cancedda | G06K 9/627 |
| | | | 382/229 |
| 2009/0292743 A1 | 11/2009 | Bigus et al. | |
| 2009/0293121 A1 | 11/2009 | Bigus et al. | |
| 2010/0114929 A1* | 5/2010 | Bonchi | G06F 17/3064 |
| | | | 707/759 |
| 2010/0228767 A1 | 9/2010 | Slinker et al. | |
| 2012/0096107 A1* | 4/2012 | Hatanaka | H04L 12/2823 |
| | | | 709/213 |
| 2012/0191457 A1* | 7/2012 | Minnis | G10L 13/10 |
| | | | 704/260 |
| 2013/0159550 A1 | 6/2013 | Vasseur | |
| 2013/0173062 A1 | 7/2013 | Koenig-Richardson | |
| 2013/0291099 A1 | 10/2013 | Donfried et al. | |
| 2014/0123249 A1 | 5/2014 | Davis et al. | |
| 2014/0172404 A1* | 6/2014 | Minov | G06F 21/577 |
| | | | 703/22 |
| 2014/0195927 A1 | 7/2014 | Deweese et al. | |
| 2015/0026181 A1 | 1/2015 | Milton et al. | |
| 2015/0081376 A1* | 3/2015 | Cardone | G06Q 10/0633 |
| | | | 705/7.27 |
| 2015/0199330 A1 | 7/2015 | Glickfield et al. | |
| 2015/0205958 A1 | 7/2015 | Turgeman et al. | |
| 2015/0331913 A1* | 11/2015 | Borowiec | H03M 7/3079 |
| | | | 707/693 |
| 2015/0371281 A1* | 12/2015 | Weinsberg | G06Q 30/0269 |
| | | | 705/14.66 |
| 2016/0164866 A1* | 6/2016 | Oberheide | H04L 63/0861 |
| | | | 726/1 |
| 2016/0300049 A1 | 10/2016 | Guedalia | |

OTHER PUBLICATIONS

Manning C G N., et al., "Inferring lexical and grammatical structure from sequences", Compression and Complexity of Sequences 1997. Proceedings Salerno, Italy Jun. 11-13, 1997, Los Alamitos, CA, USA,IEEE Comput. Soc, US, Jun. 11, 1997 (Jun. 11, 1997), pp. 265-274, XP010274909, ISBN: 978-0-8186-8132-5.

Brech B., et al., "The Interconnecting of Everything," IBM Corporation, 2013, pp. 1-6.

Giura P., et al., "Is It Really You? User Identification Via Adaptive Behavior Fingerprinting," CODASPY '14 Proceedings of the 4th ACM conference on Data and application security and privacy, 2014, pp. 333-344.

Guo B., et al., "From the internet of things to embedded intelligence," 2012, pp. 1-29.

Ketabdar H., et al., "Motion and audio analysis in mobile devices for remote monitoring of physical activities and user authentication," Journal of Location Based Services, 2011, vol. 5 (3-4), pp. 182-200.

Lloret J., et al., "Ubiquitous Monitoring of Electrical Household Appliances," Sensors, 2012, vol. 12, pp. 15159-15191.

Schneider S., "Understanding the Protocols Behind the Internet of Things," Electronic Design, 2013, 8 pages.

* cited by examiner

Two Points in Centroid 1
- Centroid 1 shifts to mean of two points
- One Point in Centroid 2

Two Centroids/States

Three Points in Centroid 1
- Centroid 1 shifts to mean of three points
- One Point in Centroid 2

Two Centroids/States

Observed Interactions:
[A] [B] [C] [A] [B] [A] [C] [A]

Derived Grammar:
272 ∽ S → 1 2 3 2,
274 ∽ where 1 → [AB], 2 → [CA], 3 → [BA]

MEASURING SEMANTIC AND SYNTACTIC SIMILARITY BETWEEN GRAMMARS ACCORDING TO DISTANCE METRICS FOR CLUSTERED DATA

TECHNICAL FIELD

Various embodiments described herein generally relate to measuring semantic and syntactic similarity between grammars according to various distance metrics for clustered data to thereby determine relationships among devices associated with the clustered data.

BACKGROUND

Grammars are becoming an increasingly important way to analyze data streams. More particularly, generative grammars naturally treat data streams as narratives that can help to reveal inherent structures, which may have practical applications in fields that include unsupervised classification, taxonomy generation, nearest neighbor searching, scientific discovery, vector quantization, speech recognition, text analysis, and navigation, among other things. Because grammars typically group data points into clusters and thereby offer at least some level of compression, grammars are typically measured and compared with respect to the compression ratios associated therewith. However, more information can be obtained from the grammar than just the percentage of space saved. For example, grammars may be measured both syntactically and semantically according to the both the form and content associated therewith. In that sense, different grammars can be compared via appropriate metrics to reach conclusions about the relative similarities and/or differences between the underlying data streams, which can yield deeper understanding about the data in an unsupervised manner. For example, grammars that are syntactically similar may reveal one kind of relationship, whereas grammars that are semantically similar may point to a different kind of relationship. However, formalized grammar metrics to determine relationships or otherwise enable more mathematical comparisons is lacking in the data analysis community even though the results from these comparisons can be used to better determine relationships between the devices that generate the data streams.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, a method for measuring similarity between clustered data grammars may comprise constructing at least a first grammar associated with a first device and a second grammar associated with a second device, wherein the first grammar and the second grammar each comprise a symbol sequence that re-expresses one or more sequenced data items and one or more rules that represent a repeated pattern in the symbol sequence, calculating one or more distance metrics that quantify a similarity between the first grammar and the second grammar according to a comparison between the one or more rules in the first grammar and the one or more rules in the second grammar, and determining a relationship between the first device and the second device according to the one or more distance metrics.

According to various aspects, an apparatus for measuring similarity between clustered data grammars may comprise means for constructing at least a first grammar associated with a first device and a second grammar associated with a second device, wherein the first grammar and the second grammar each comprise a symbol sequence that re-expresses one or more sequenced data items and one or more rules that represent a repeated pattern in the symbol sequence, means for comparing the one or more rules in the first grammar and the one or more rules in the second grammar to calculate one or more distance metrics that quantify a similarity between the first grammar and the second grammar, and means for determining a relationship between the first device and the second device according to the one or more distance metrics.

According to various aspects, an apparatus may comprise one or more network access ports configured to receive at least a first data stream from a first device and a second data stream from a second device, wherein the first data stream and the second data stream each include one or more sequenced data items, and one or more processors configured to construct a first grammar associated with the first device and a second grammar associated with the second device, wherein the first grammar and the second grammar each comprise a symbol sequence that re-expresses the one or more sequenced data items in the respective data streams received from the first device and the second device, calculate one or more distance metrics that quantify a similarity between the first grammar and the second grammar according to a comparison between one or more rules that represent a repeated pattern in the symbol sequence associated with the first grammar and one or more rules that represent a repeated pattern in the symbol sequence associated with the second grammar, and determine a relationship between the first device and the second device according to the one or more distance metrics.

According to various aspects, a computer-readable storage medium may have computer-executable instructions recorded thereon, wherein executing the computer-executable instructions on one or more processors may cause the one or more processors to construct at least a first grammar associated with a first device and a second grammar associated with a second device, wherein the first grammar and the second grammar each comprise a symbol sequence that re-expresses one or more sequenced data items and one or more rules that represent a repeated pattern in the symbol sequence, calculate one or more distance metrics that quantify a similarity between the first grammar and the second grammar according to a comparison between the one or more rules in the first grammar and the one or more rules in the second grammar, and determine a relationship between the first device and the second device according to the one or more distance metrics.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1A:
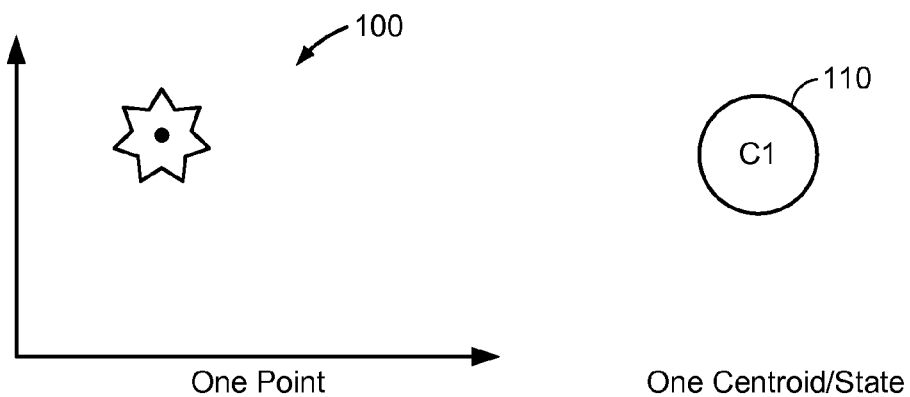
FIG. 1A-1D illustrate various examples in which a scattergram can be converted to a state machine, according to various aspects.
Figure 1B:
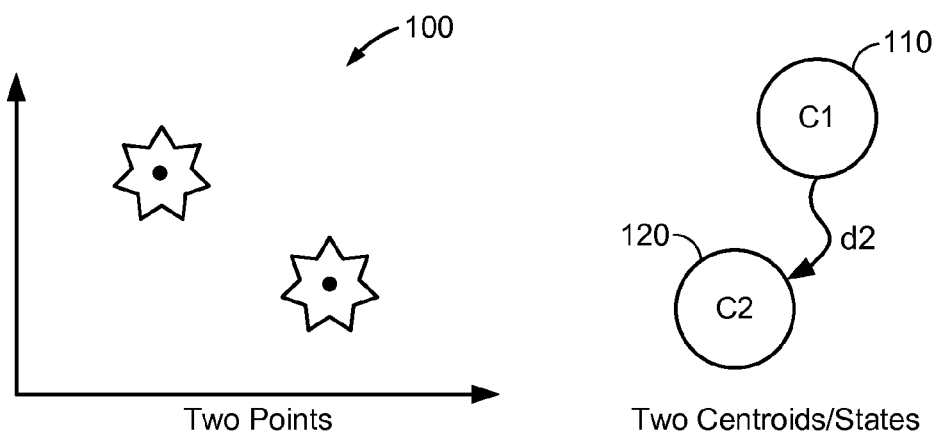

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "client device," "user equipment" (or "UE"), "user terminal," "user device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof are used interchangeably to refer to any suitable mobile or stationary device that may operate that can communicate with a radio access network (RAN) that implements a particular radio access technology (RAT), over a wired network, over a Wi-Fi networks (e.g., based on IEEE 802.11, etc.), and/or with other devices over direct device-to-device (D2D) or peer-to-peer (P2P) connections.

Furthermore, as used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have an active communication interface, such as a modem, a transceiver, a transmitter-receiver, or the like, a passive interface (e.g., a quick response (QR) code, a radio-frequency identification (RFID) tag, an NFC tag, etc.), and/or any suitable combination thereof. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to a personal network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the personal network. IoT devices may also include cell phones, desktop computers, laptop computers, tablet computers, personal digital assistants (PDAs), etc. Accordingly, the personal network may be comprised of a combination of "legacy" Internet-accessible devices (e.g., laptop or desktop computers, cell phones, etc.) in addition to devices that do not typically have Internet-connectivity (e.g., dishwashers, etc.).

Accordingly, as used herein, the generic term "device" may refer to an IoT device, a client device, a UE, a user terminal, a user device, a communication device, a wireless device, a wireless communications device, a handheld device, a mobile device, a mobile terminal, a mobile station, a handset, an access terminal, a subscriber device, a subscriber terminal, a subscriber station, a terminal, a desktop computer, a laptop computer, a tablet computer, a server computer, or any other suitable machine that can generate a data stream that includes one or more data items or other suitable objects that can be expressed according to points, feature vectors, or other suitable data representations that can be grouped or otherwise arranged into clusters that can symbolize multiple similar or otherwise related items. For example, in the various aspects and embodiments described herein, the clusters (and specifically the centroids associated with the clusters) may represent proxies that re-express the original sequenced items in the data streams that are grouped or otherwise arranged into the clusters.

Accordingly, in the various aspects and embodiments described herein, the terms "grammar," "data grammar," "generative grammar," "cluster grammar," and other variants thereof may refer to a data structure or other suitable construct that include one or more rules that represent repeated patterns, structures, sub-patterns, and sub-structures that appear in sequenced clusters that are distilled from sequenced items in original data streams that certain devices may have generated, whereby the grammar rules may note the repeated patterns, structures, sub-patterns, sub-structures, etc. in the sequenced clusters to thereby compress the original data streams while preserving a time sequence associated with the sequenced data items in the original data streams. Accordingly, the sequenced data items in the original data streams can then be reconstituted from the grammar rules, which may comprise flat rules that only include original symbols or data items appearing in the original data streams and/or hierarchical rules that reference other rules, wherein the hierarchical rules may be nested and flattened to enable analysis and comparisons according to various distance metrics that can quantify grammar properties to indicate semantic and/or syntactic similarities among different rules and/or different grammars and provide insight into relationships among the devices that generated the original data streams based on data narratives that emerge from the sequenced clusters that the grammars represent.

According to various aspects, the following description generally relates to various distance metrics that can be used to quantify certain grammar properties and thereby enable comparisons between different grammars that may yield insight into relationships between sources that generated original data streams that are re-expressed in the compared grammars (e.g., devices, users, etc.). For example, devices are becoming smaller and are now embedded in many different products that may be organized within networks and other environments, which makes devices more dynamic and harder to classify into groups or other contextually relevant arrangements. Accordingly, as technology evolves and devices work together in ways that are far more sophisticated and powerful than any single device could possibly act individually, data streams that devices generate are growing at a faster rate than the data streams can be analyzed. For example, in a system where five devices are acting as speakers in a surround sound system and a sixth device (e.g., a subwoofer) is subsequently added, the value from going from a surround system with five speakers to one with six speakers may be greater than the combined value from the six speakers individually (e.g., the added value from having a 5.1 surround sound system that provides a more holistic audio experience rather than a six-channel sound system where each speaker outputs the same audio). As such, "clustering" techniques may address certain problems that arise with respect to analyzing larger and larger data streams.

More particularly, assuming an original data stream that includes one or more data items arranged according to a time sequence such that the data items to be clustered are available as points (or vectors) in a d-dimensional Euclidean space, clustering may place the data items into groups such that the items placed into a particular cluster are considered more "similar" to one another than to items that are placed into other clusters. For example, one common clustering algorithm is the k-means clustering algorithm, which generally seeks a minimum variance data grouping that minimizes the sum of squared Euclidean distances from certain cluster centroids that can represent proxies to replace or otherwise re-express the original data items placed into the clusters. In general, the k-means algorithm includes four steps: (i) an initialization step in which k starting points may be selected randomly or according to some heuristic, (ii) a distance calculation step in which a Euclidean distance to each cluster centroid may be computed for each data point such that each data point can be assigned to a closest cluster centroid, (iii) a centroid recalculation step in which each cluster centroid may be recalculated according to the average data points assigned thereto, and (iv) a convergence step in which steps (ii) and (iii) are repeated until some convergence condition has been satisfied. Accordingly, clustering algorithms may produce clusters that can each symbolize many similar data items, thereby compressing the original data set because the clusters centroids can effectively replace or otherwise re-express many original data items.

More particularly, according to various aspects, clustering may start with data collection in which a server or other suitable entity may collect original data streams that each include multiple sequenced data items. The sequenced data items may then be analyzed to generate feature vectors that represent certain characteristics associated therewith, wherein the feature vectors can then be statistically clustered to assign each feature vector to a centroid and thereby group the sequenced data items into sequenced clusters. Accordingly, each original data item can then be re-expressed according to the centroid in which the original data item was grouped, and a grammar can be constructed from the resulting centroid sequence. For example, to create the clusters and the resulting grammars, the server or other entity that collects the original data streams can first generate a scattergram that can subsequently be converted to a state model, wherein the scattergram may depict structured knowledge and the state diagram may depict a data narrative that emerges from re-expressing the original data streams. Accordingly, the state diagram may generally capture more information than the scattergram, and the resulting data narrative can be further analyzed and compressed according to grammar substitution rules that are based on repeated substructures in the cluster sequence.

Figure 1C:
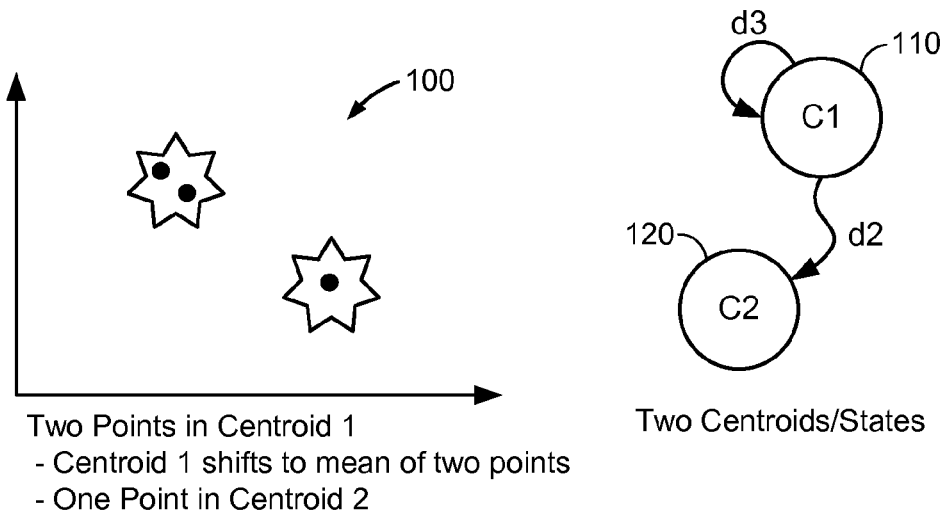
Figure 1D:
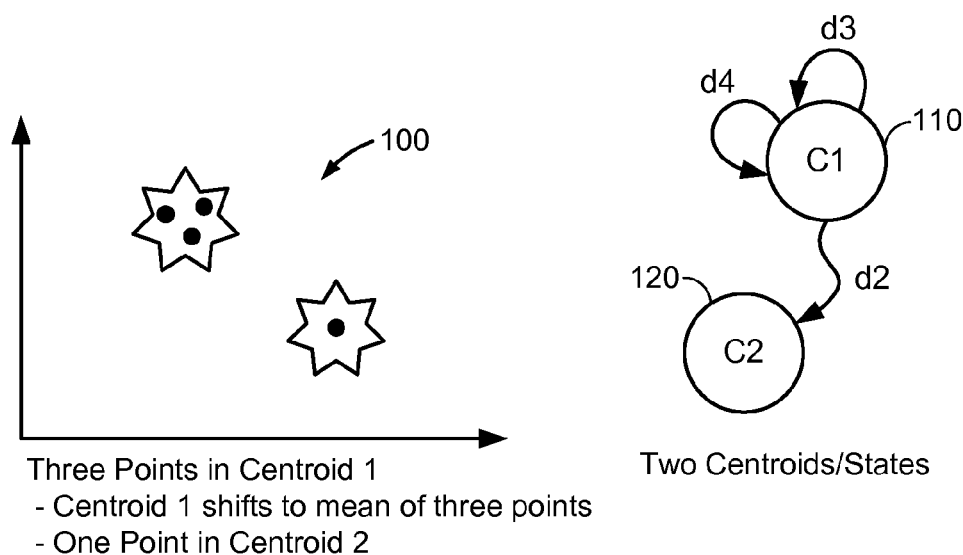

More particularly, according to various aspects, FIG. 1A through FIG. 1D illustrate various examples to demonstrate how a scattergram can be created and then converted into a state machine. In FIG. 1A through FIG. 1D, the server or other entity that collects the original data streams may generally place the data items contained therein into clusters, find the centroids associated with the clusters, define the axes, and map the data to a state machine, where each centroid may represent a state and each data point may represent a state transition. For example, in FIG. 1A, a scattergram 100 includes one point, which corresponds to one centroid or state C1 110. Furthermore, in FIG. 1B, a second point has been added to the scattergram 100, where the second point is placed in a separate cluster with a second centroid or state C2 120 and the second data point indicates a transition "d2" from centroid/state C1 110 to centroid/state C2 120. In FIG. 1C, a third point has been added to the scattergram 100 and placed into centroid/state C1 110, which now includes two points and has been shifted to the mean associated with the two points. Furthermore, because the first and third points have been placed in the same centroid/state C1 110, the first point and the third point may be considered more "similar" to each other than the second point placed in centroid/state C1 120, and the third data point indicates a transition "d3" from centroid/state C1 110 back to centroid/state C1 110. In FIG. 1D, a fourth point has been added to the scattergram 100 and also placed into centroid/state C1 110, which now includes three points and has been shifted to the mean associated with the first, third, and fourth points placed therein. Furthermore, as with the first and third points, the fourth point placed into the same centroid/state C1 110 as the first and third points may therefore be considered more "similar" to the first and third points than the second point, and in a similar respect to the third point, the fourth point indicates a transition "d4" from centroid/state C1 110 back to centroid/state C1 110 to reflect a distance between the fourth point and the centroid/state C1 110 into which the fourth point was placed.

Figure 2A:
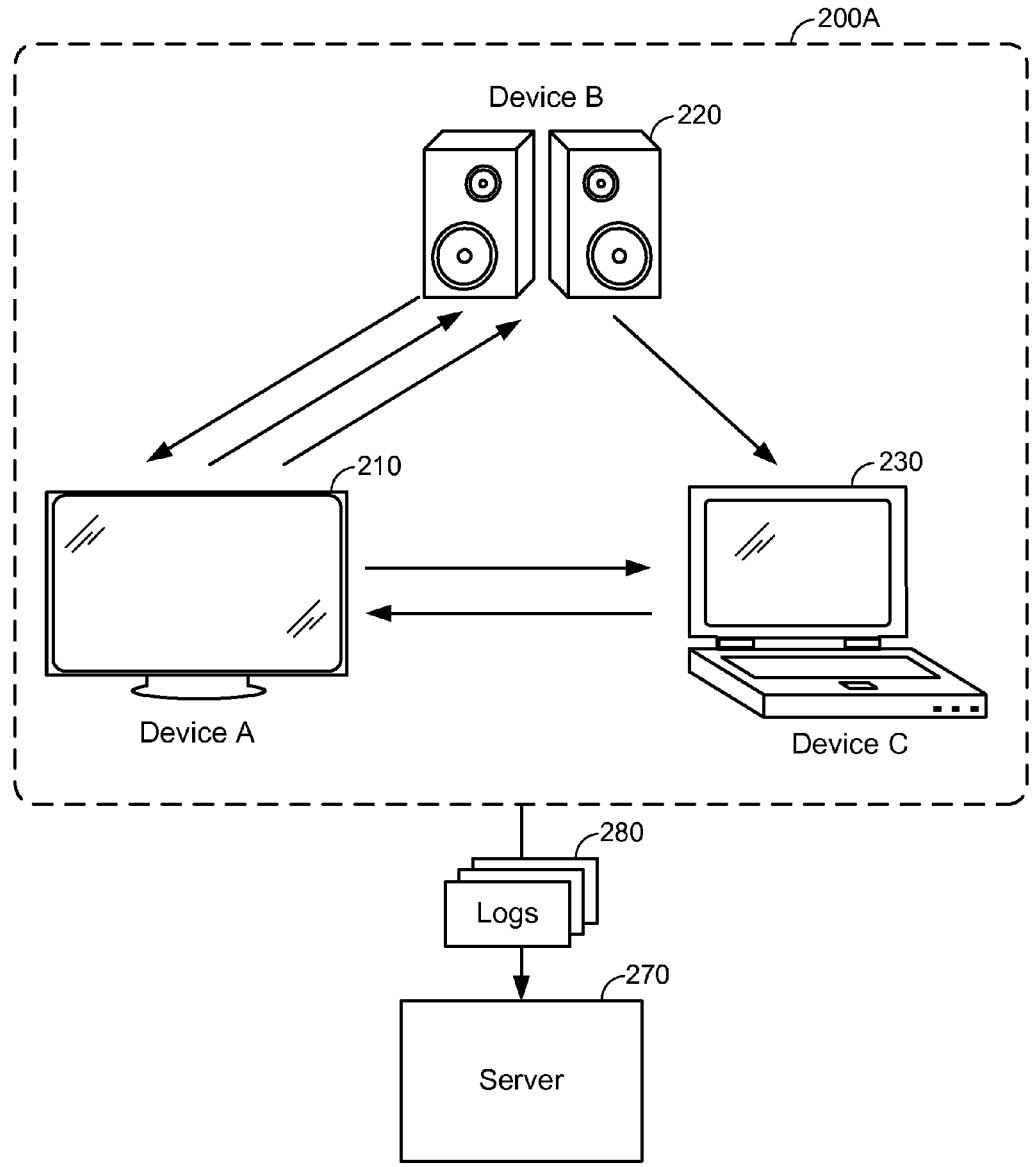
FIG. 2A.
Figure 2B:
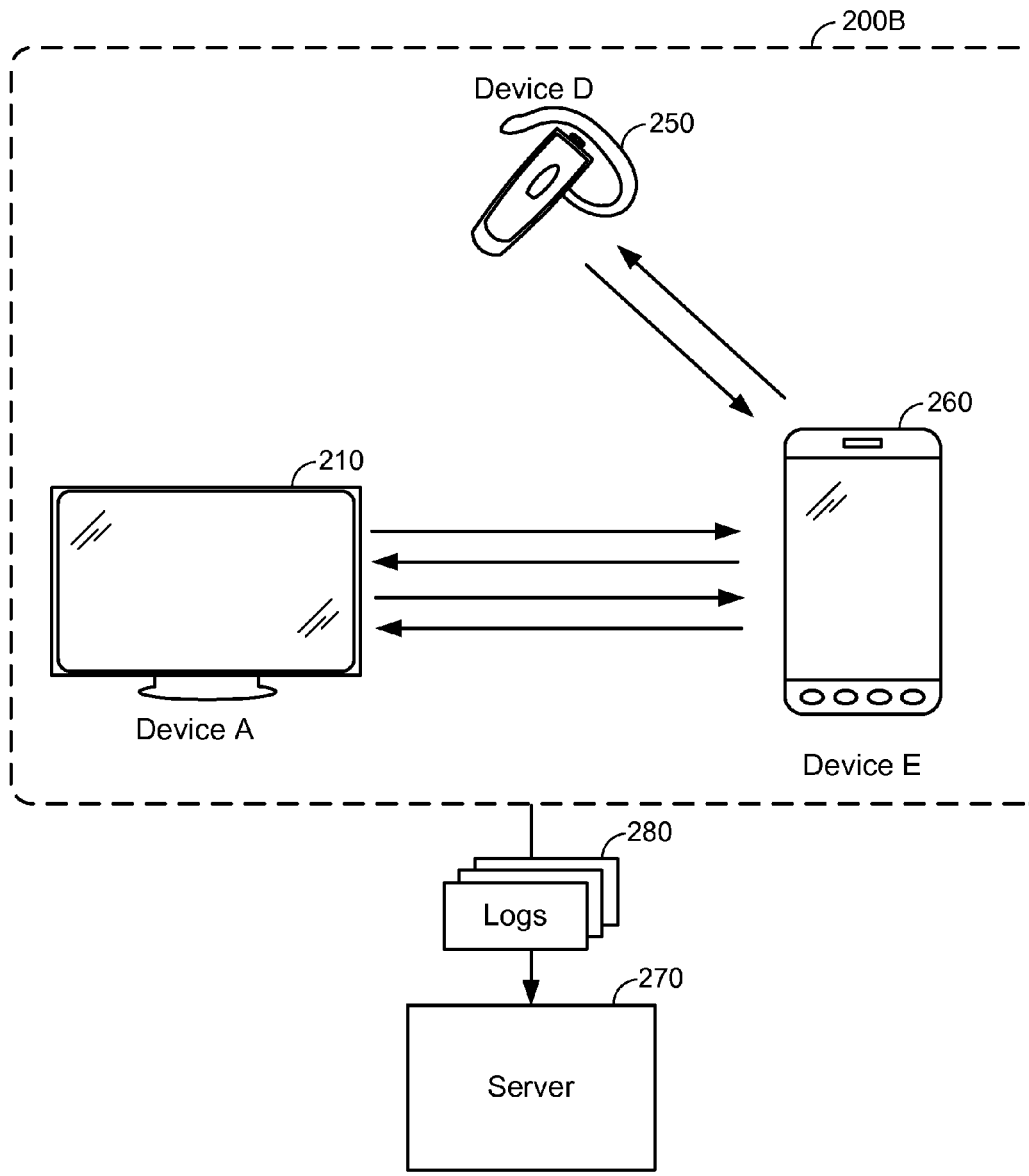
FIG. 2B illustrate exemplary interaction sequences among various devices that can be analyzed and re-expressed according to a grammar to symbolize the sequenced interactions among the various devices, according to various aspects.

After generating the scattergram 100 to place the four original data points into the centroids/states C1 110, C2 120 and further representing the transitions d2, d3, d4 among the centroids/states C1 110, C2 120 to re-express the sequence associated with the four original data points, a grammar can then be constructed to describe or otherwise re-express the sequenced original data points. For example, according to various aspects, FIG. 2A and FIG. 2B illustrate exemplary interaction sequences among various devices that can be analyzed and re-expressed according to a grammar to symbolize the sequenced interactions among the various devices. More particularly, FIG. 2A may generally illustrate an environment 200A (e.g., an IoT network or other suitable environment) that includes Device A 210, Device B 220, and Device C 230, where the various arrows between devices 210-230 illustrate sequenced interactions among the various devices 210-230. Furthermore, in various embodiments, the sequenced interactions among the various devices 210-230 may be detected and logged at each of the devices 210-230 from a local perspective, at an intermediary node (not shown) such as a packet sniffer, monitoring agent, or other suitable entity, at one of the devices 210-230 that acts as the intermediary node to detect and log the sequenced interactions, or any suitable combination thereof. In any case, the sequenced interactions among the devices 210-230 may be transmitted to a server 270 within one or more logs 280 that represent or otherwise describe the sequenced interactions, wherein the server 270 may then generate one or more feature vectors from the sequenced interactions represented in the logs 280, cluster the feature vectors into one or more sequenced centroids, and construct a grammar from the resulting sequenced centroids.

Accordingly, in various embodiments, the original sequenced interactions that are represented in the logs 280 can be re-expressed according to the new centroid (or cluster) sequence, where each original interaction may be replaced with the centroid (or cluster) into which the original interaction was placed. Furthermore, in various embodiments, the sequenced centroids that form the grammar re-expressing the original interaction sequences can be further analyzed and compressed according to grammar substitution rules that note repeated substructures in the sequenced centroids that form the grammar. For example, in FIG. 2A, the sequence of interactions represented in the logs 280 includes an interaction [A] [B] to represent Device A 210 interacting with Device B 220, an interaction [C] [A] to represent Device C 230 interacting with Device A 210, an interaction [B] [A] to represent Device B 220 interacting with Device A 210, and an interaction [C] [A] to represent another instance in which Device C 230 interacts with Device A 210, resulting in the total interaction sequence [A] [B] [C] [A] [B] [A] [C] [A]. The server 270 may then use the Sequitur (or Nevill-Manning) algorithm to construct a grammar based on the original sequence, wherein the Sequitur algorithm may generally infer a hierarchical structure (e.g., a context-free grammar) from a discrete symbol sequence and substitute repeating substructures in the symbol sequence to compress the original data while preserving the sequence associated therewith. For example, the Sequitur algorithm may generally start with a sequenced string that includes multiple "terminal symbols" that correspond to elementary lexical symbols that are defined in the grammar language and used to produce the rules that constitute the grammar, whereas "nonterminal symbols" (or syntactic variables) correspond to symbols that can be replaced with grouped terminal symbols according to the rules associated with the grammar. Accordingly, in the above interaction sequence [A] [B] [C] [A] [B] [A] [C] [A], the terminal symbols may comprise [A], [B], and [C]. To construct the grammar from the interaction sequence, the server 270 may initially scan the sequenced terminal symbols and build a list that indicates each symbol pair read therein (e.g., [A] [B], [C] [A], and [B] [A]). Each second or subsequent instance associated with a particular symbol pair may then be replaced in the sequence with a nonterminal symbol, and the scanning may continue until the entire sequence has been processed. Accordingly, in FIG. 2A, the original interaction sequence [A] [B] [C] [A] [B] [A] [C] [A] may be re-expressed according to a grammar having a symbol sequence 272 that comprises S→1 2 3 2 to represent one or more repeated patterns (or rules) 274, where "1" indicates a non-terminal symbol that can replace terminal symbol pair [A] [B] in the symbol sequence 272, "2" indicates a non-terminal symbol that can replace terminal symbol pair [C] [A] in the symbol sequence 272, and "3" indicates a nonterminal symbol that can replace terminal symbol pair [B] [A] in the symbol sequence 272.

Referring now to FIG. 2B, the environment 200B illustrated therein includes Device A 210, Device D 250, and Device E 260, where the various arrows between devices 210, 250, and 260 similarly illustrate sequenced interactions among the devices 210, 250, 260. Accordingly, one or more logs 280 representing the sequenced interactions among the devices 210, 250, 260 may be transmitted to the server 270, which may then construct a grammar to re-express the sequenced interactions. For example, in FIG. 2B, the sequenced interactions represented in the logs 280 includes interaction [A] [E] to represent Device A 210 interacting with Device E 260, interaction [D] [E] to represent Device D 250 interacting with Device E 260, interaction [A] [E] to represent another instance in which Device A 210 interacts with Device E 260, and interaction [D] [E] to represent another instance in which Device D 250 interacts with Device E 260, resulting in the overall interaction sequence [A] [E] [D] [E] [A] [E] [D] [E]. Accordingly, using the Sequitur algorithm, the server 270 may re-express the interaction sequence [A] [E] [D] [E] [A] [E] [D] [E] according to a grammar in which the symbol sequence 272 comprises S→3 3 to represent one or more repeated patterns (or rules) 274, where "1" indicates a non-terminal symbol that can replace terminal symbol pair [A] [E] in the symbol sequence 272, "2" indicates a non-terminal symbol that can replace terminal symbol pair [D] [E] in the symbol sequence 272, and "3" indicates a non-terminal symbol that can replace non-terminal symbol pair [1] [2] in the symbol sequence 272 (i.e., terminal symbol sequence [A] [E] [D] [E]).

In various embodiments, the server 270 can then compare the constructed grammars shown below to determine similarities or derive other information. For example, in various embodiments, a metric may quantify the depth associated with each grammar and thereby enable comparison between the grammars (e.g., an integer score that represents the rule nesting level in each grammar, where the depth metric associated with Grammar 1 is one because no rules reference another rule, whereas the depth metric associated with Grammar 2 is two because rule 3 references rules 1 and 2). In another example, a metric to quantify the complexity associated with the grammars may comprise a binary classification, wherein the complexity metric may be zero to indicate that the grammar is "context-free" where symbols that surround the rules do not influence the rules, whereas the complexity metric may be one to indicate that the grammar is "contextual" where the symbols that surround the rules do have an influence on the rules.

| Grammar 1 | Grammar 2 |
|---|---|
| [A] [B] [C] [A] [B] [A] [C] [A] | [A] [E] [D] [E] [A] [E] [D] [E] |
| S → 1 2 3 2 | S → 3 3 |
| 1 → AB | 1 → AE |
| 2 → CA | 2 → DE |
| 3 → BA | 3 → 1 2 |

Figure 3:
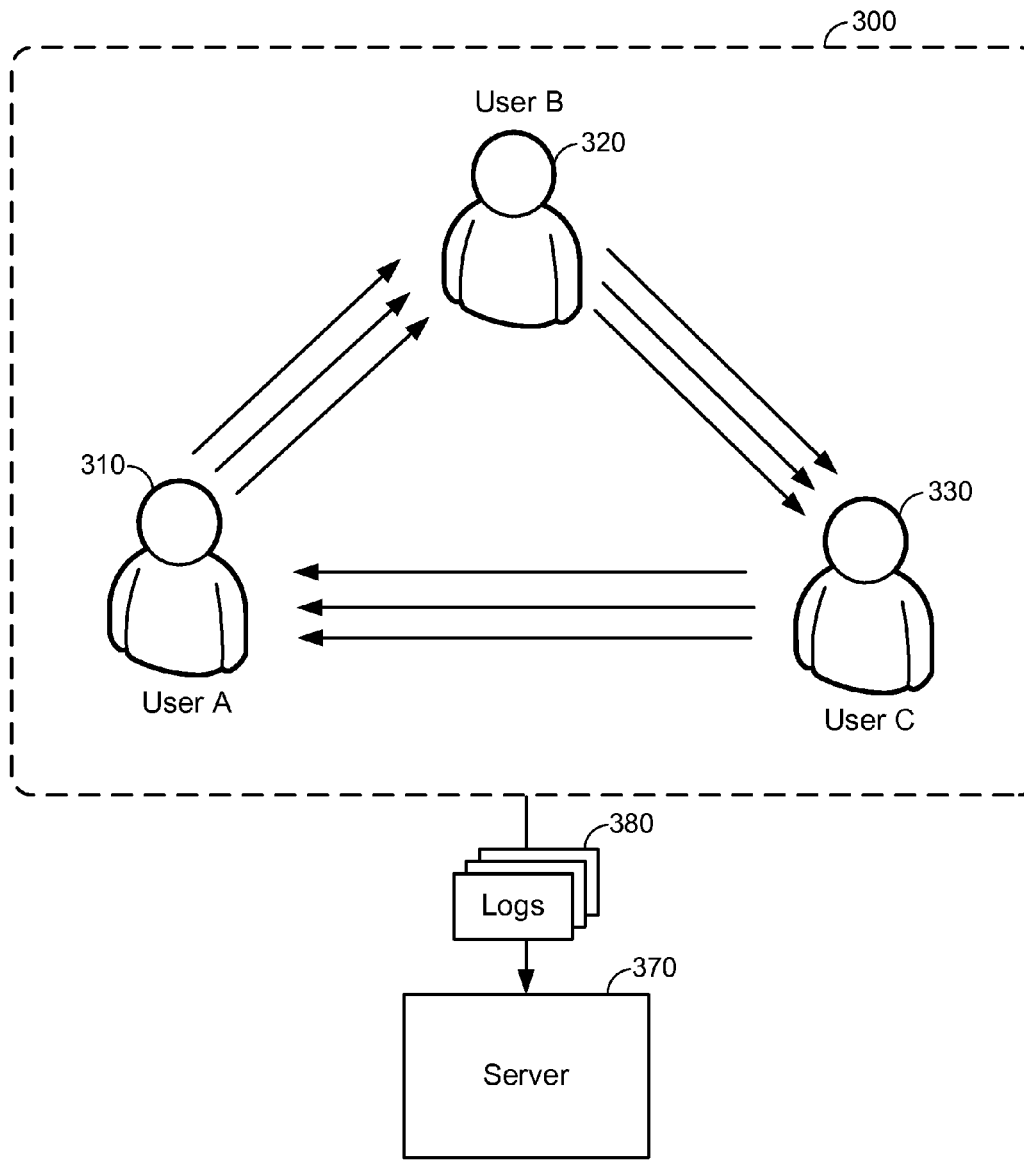
FIG. 3 illustrates an exemplary sequence in which proximity detections between a first user, a second user, and a third user can be re-expressed according to a grammar that symbolizes the proximity detections, according to various aspects.

Furthermore, in various embodiments, the techniques described above can be used to determine various other relationships (e.g., among users based on proximity to one another). For example, according to various aspects, FIG. 3 illustrates an exemplary sequence in which proximity detections between a first user 310, a second user 320, and a third user 330 that occur in an environment 300 can be re-expressed according to a grammar that symbolizes the proximity detections, which may be detected at devices (e.g., smartphones) associated with the users 310, 320, 330. In FIG. 3, the various arrows between the users 310, 320, 330 illustrate the users 310, 320, 330 coming into proximity with each other, whereby one or more logs 380 representing the sequenced proximity detections may be transmitted to the server 370, which may then construct a grammar to re-express the sequenced proximity detections. For example, in FIG. 3, the logs 380 represent the proximity detection sequence [A] [B] [C] [A] [B] [C] [A] [B] [C] [A], which may be re-expressed according to a grammar in which a symbol sequence 372 comprises S→4 3 4 to represent one or more repeated patterns (or rules) 374, where the non-terminal symbol "1" represents proximity detection pair [A] [B], the non-terminal symbol "2" represents proximity detection pair [C] [A], the non-terminal symbol "3" represents proximity detection pair [B] [C], and the non-terminal symbol "4" represents non-terminal symbol pair [1] [2] (i.e., terminal symbol sequence [A] [B] [C] [A]). In various embodiments, the server 370 can then define one or more actions to occur in the environment 300 in response to detecting the constructed grammar. For example, the server 370 may determine the one or more actions to perform through prior knowledge, expert system analysis, and/or previous examples from other environments (e.g., if the users 310, 320, 330 typically turn on the television and change lighting to television mode when coming into proximity to one another, the action triggered in response to detecting the grammar may be to turn on a surround sound speaker system whenever the grammar is detected).

Accordingly, in the various aspects and embodiments described herein, a grammar may generally comprise one or more rules generated from an original symbol sequence, usually characters arranged in a string, via the Sequitur algorithm that compresses data and preserves the original sequence. As such, the grammar rules may represent patterns and sub-patterns distilled from the original symbol sequence, which can then be reconstituted from the grammar rules. For example, in various embodiments, a grammar may comprise flat rules that consist only of the terminal symbols in the original sequence, hierarchical rules that reference other rules, and/or nested hierarchical rules that are flattened to enable analysis and comparison. Furthermore, additional properties associated with a grammar can include a length or count indicating how many symbols comprise the string or rule, a count indicating how many unique symbols appear in the string or rule, and/or a count indicating how many rules the grammar includes. In that context, a generic example to show an original string and the rules that may form a grammar is shown below:

Original String
    abadcdadcdadcdcdadcdbada
        clusters have been symbolized with letters in the alphabet
Rules may be nested and may contain non-terminal symbols
    Rule 0→a b 1 1 1 c d 1 b 2 a
    Rule 1→2 c d #Note that Rule 1 references Rule 2
    Rule 2→a d #Note that nested Rule 2 only has terminal symbols Flatten all rules except the zeroth rule such that only terminal symbols remain
    Rule 0→a b 1 1 1 c d 1 b 2 a #Zeroth rule has not been expanded
    Rule 1→a d c d #Rule 2 has been replaced with the component symbols
    Rule 2→a d Accordingly, in the various aspects and embodiments described herein, various sequenced data items in an original data stream can be placed into sequenced clusters that essentially replace or otherwise re-express the original data items, wherein a data narrative may emerge from the sequenced clusters that re-express the sequenced data items in the original data stream. The data narrative can then be further analyzed and compressed according to substitution rules associated with the grammar that comprises the sequenced clusters, wherein the grammar may note repeated patterns, structures, sub-patterns, sub-structures in the sequenced clusters to create rules from the data narrative. As such, in various embodiments, different resulting cluster grammars can be compared to determine the similarity or closeness between the data items used to form the cluster grammars, and in a similar respect, the cluster grammars can be compared to determine relationships between devices or other sources associated with the original data streams used to form the cluster grammars (e.g., where devices having similar cluster grammars may signify that users associated with the devices have a closer relationship than users associated with devices that have dissimilar cluster grammars). In that context, the following description details various grammar distance metrics that can quantify the closeness between two grammars, whereby appropriate relationship analysis applications can leverage the grammar distance metrics to infer or otherwise determine relationships based on grammar comparisons.

Figure 4:
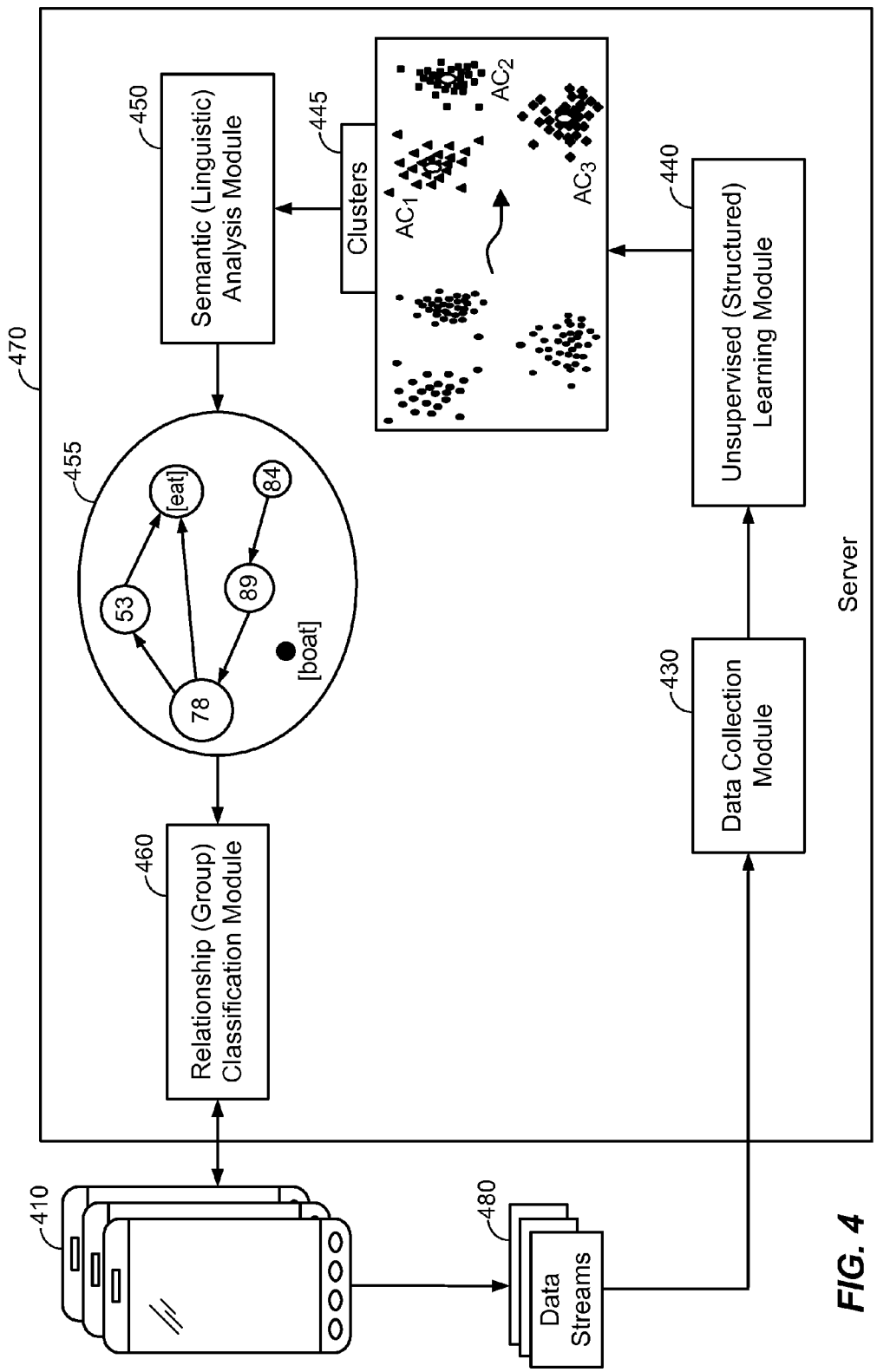
FIG. 4 illustrates an exemplary environment in which data streams from multiple devices may be used to construct grammars that cluster or otherwise re-express the data streams, which may then be analyzed to measure syntactic and semantic similarities between the grammars and thereby analyze relationships among the devices that generated the data streams, according to various aspects.

More particularly, according to various aspects, FIG. 4 illustrates an exemplary environment in which original data streams 420 from multiple devices 410 may be used to construct grammars 455 that cluster or otherwise re-express the original data streams 420, which may then be analyzed to measure syntactic and semantic similarities between the grammars 455 and thereby analyze relationships among the devices 410 that generated the original data streams 410. For example, in various embodiments, the devices 410 may provide the original data streams 420 to a server 470, which may include a data collection module 430 that receives or otherwise collects the original data streams 420, which are then provided to an unsupervised (structured) learning module 440 that can create one or more clusters 445 and place each sequenced data item contained in the original data streams 420 into a cluster 445. In various embodiments, a semantic (linguistic) analysis module 450 may then arrange the clusters 445 into a sequence, assign a terminal symbol to each unique cluster 445, and identify patterns, structures, sub-patterns, sub-structures, etc. that repeat in the symbol sequence that represents the sequenced clusters 445. As such, the semantic (linguistic) analysis module 450 may then create one or more rules to represent the repeating patterns, structures, sub-patterns, sub-structures, etc. in the symbol sequence, create one or more hierarchical and/or nested rules that reference other rules (if applicable), and flatten each rule such that only terminal symbols remain except that the zeroth rule that represents the original symbol sequence is not flattened. Accordingly, the semantic (linguistic) analysis module 450 may create one or more grammars 455 from the sequenced clusters 445 and the rules created to represent the repeating patterns, structures, sub-patterns, sub-structures, etc. therein, and a relationship (group) classification module 460 may then compare the resulting grammars 455 according to one or more distance metrics that can quantify the syntactic and/or semantic similarity therebetween.

For example, to explain the various distance metrics that can be used to quantify the closeness between the grammars 455 and thereby provide insight into relationships among the devices 410 that generated the original data streams 420 associated with the grammars 455, the following description assumes a use case in which the devices 410 that provide original data streams 420 to the server 470 include three devices, referred to herein as "Device A," "Device B," and "Device C." Furthermore, the following description assumes that the grammars 455 formed from the original data streams 420 received from Device A, Device B, and Device C comprise the original strings and rules shown below:

Device A
  Original String
    a b a d c d a d c d a d c d c d a d c d b a d a
    length=24
    unique elements=4
  Flattened Rules; Ignore zeroth rule corresponding to original string
    0→a b 1 1 1 c d 1 b 2 a
    1→a d c d
    2→a d
  Flattened Rule Properties; Ignore zeroth rule corresponding to original string
    {flattened rule lengths: count per length}={4:1, 2:1}
    flattened rule count=2
    total rule length=6
    average rule length=3.00
Device B
  Original String
    b b b a b a d c d a d c d a d c d c b a a c d b a c c
    length=27
    unique elements=4
  Flattened Rules; Ignore zeroth rule corresponding to original string
    0→b b 1 1 2 2 3 c 1 a c d 1 c c
    1→b a
    2→d c d a
    3→d c d
  Flattened Rule Properties; Ignore zeroth rule corresponding to original string
    {flattened rule lengths: count per length}={2:1, 4:1, 3:1}
    flattened rule count=3
    total rule length=9
    average rule length=3.00
Device C
  Original String
    e b e a b b a d c d a d c d a d c d a b c d d a d c c e
    length=28
    unique elements=5
  Flattened Rules; Ignore zeroth rule corresponding to original string
    0→e b e 1 b 2 2 2 1 c d d 3 c e
    1→a b
    2→a d c d
    3→a d c Flattened Rule Properties; Ignore zeroth rule corresponding to original string
{flattened rule lengths: count per length}={2:1, 4:1, 3:1}
flattened rule count=3
total rule length=9
average rule length=3.00

In various embodiments, the server 470 may calculate one or more distance metrics to quantify syntactic similarities and/or semantic similarities between disparate original data streams 420 using the relationship (group) classification module 460, which may tailor the distance metrics according to the particular application context and data types used to form the resulting cluster grammars 455. In general, the distance metrics can be assumed to be commutative or symmetric, meaning that $D_{A \rightarrow B}$ representing a distance from the grammar 455 associated with Device A to the grammar 455 associated with Device B will be the same as $D_{B \rightarrow A}$ representing the distance from the grammar 455 associated with Device B to the grammar 455 associated with Device A. Furthermore, each distance metric described in further detail below may be a normalized $L_1$ norm (e.g., a geometric metric in which the distance between two points is the sum of the absolute differences between the Cartesian coordinates associated therewith, sometimes referred to as a Taxicab norm or Manhattan distance), wherein each distance metric may range from zero to one and multiple individual distance metrics may be averaged to determine the total net distance between two grammars 455. Furthermore, as described in more detail below, the grammar distance metrics may be based on aggregate (e.g., global) rule comparisons rules to quantify similarities in syntactical form and individual (e.g., content-based) rule comparisons to quantify similarities in semantic meaning.

More particularly, in various embodiments, the grammar distance metrics that are based on aggregate rule comparisons rules may include a rule count distance metric that can quantify the syntactic similarity between two grammars 455 according to the total rule count in the grammars 455 associated with a particular device pair, wherein the rule count distance metric can be calculated according to the following formula, where $\#R_i$ denotes the rule count in the grammar 455 associated with Device i:

$$D \propto \frac{|\#R_A - \#R_B|}{(\#R_A + \#R_B)}$$

Accordingly, based on the above example where the grammar 455 associated with Device A has two flattened rules (i.e., $\#R_A$=2), the grammar 455 associated with Device B has three flattened rules (i.e., $\#R_B$=3), and the grammar 455 associated with Device C has three flattened rules (i.e., $\#R_C$=3), the rule count distance metric associated with each device pair may be calculated as follows:

TABLE 1

| Rule Count Distance Metric | | |
|---|---|---|
| Device Pair | Calculations | Rule Count Distance Metric |
| A → B | $\frac{\|2-3\|}{2+3}$ | 0.2000 |
| A → C | $\frac{\|2-3\|}{2+3}$ | 0.2000 |

TABLE 1-continued

| Rule Count Distance Metric | | |
|---|---|---|
| Device Pair | Calculations | Rule Count Distance Metric |
| B → C | $\frac{\|3-3\|}{3+3}$ | 0.0000 |

In various embodiments, the grammar distance metrics based on aggregate rule comparisons rules may further include an average rule length distance metric that can quantify the syntactic similarity between two grammars 455 according to a comparison between the average rule length in the grammars 455 associated with each device pair, wherein the average rule length distance metric can be calculated according to the following formula, where $|R_i|$ denotes the length associated with a rule in the grammar 455 associated with Device i, $\langle |R_i| \rangle$ denotes the average rule length in the grammar 455 associated with Device i, and the rule length refers to the symbol count in each rule:

$$D \propto \frac{|\langle |R_A| \rangle - \langle |R_B| \rangle|}{\langle |R_A| \rangle + \langle |R_B| \rangle}$$

Accordingly, in the above example, the grammar 455 associated with Device A has one rule with four symbols and one rule with two symbols such that $\langle |R_A| \rangle$=3 and the grammars 455 associated with Device B and Device C each have one rule with two symbols, one rule with four symbols, and one rule with three symbols such that $\langle |R_B| \rangle$=3 and $\langle |R_C| \rangle$=3. As such, the average rule length distance metric associated with each device pair may be calculated as follows:

TABLE 2

| Average Rule Length Distance Metric | | |
|---|---|---|
| Device Pair | Calculations | Rule CountDistance Metric |
| A → B | $\frac{\|3-3\|}{3+3}$ | 0.0000 |
| A → C | $\frac{\|3-3\|}{3+3}$ | 0.0000 |
| B → C | $\frac{\|3-3\|}{3+3}$ | 0.0000 |

In various embodiments, the grammar distance metrics based on aggregate rule comparisons rules may further include an equal length rule count metric that can quantify the syntactic similarity between two grammars 455 according to a comparison based on how many rules having an equal length are in the grammars 455 associated with each device pair. In that sense, the equal length rule count metric may differ from the rule count distance metric and the average rule length distance metric in that the equal length rule count metric compares aggregate counts between individual rules, which may quantify a lower-level syntactic similarity between the grammars 455. Accordingly, the equal length rule count metric can be calculated according to the following formula, where $\#|R_{A_i}|$ denotes how many rules in the grammar 455 associated with Device A have length i, and where i further serves as the summation index:

$$D \propto \frac{\sum_i \frac{||\#|R_{A_i}| - \#|R_{B_i}||}{\#|R_{A_i}| + \#|R_{B_i}|}}{\max(\#R_A, \#R_B)},$$

which is equivalent to:

$$D \propto \frac{\sum_i^{\max(|R_A|)} \left[1 - 2\frac{\min(\#|R_{A_i}|, \#|R_{B_i}|)}{\#|R_{A_i}| + \#|R_{B_i}|}\right]}{\max(\#R_A, \#R_B)}$$

Accordingly, in the above example where Device A has a grammar 455 that includes one rule having four symbols and one rule having two symbols, Device B has a grammar 455 that includes one rule having two symbols, one rule having four symbols, and one rule having three symbols, and Device C has a grammar 455 that includes one rule having two symbols, one rule having four symbols, and one rule having three symbols, the inputs to the equal length rule count distance metric may be expressed as follows:

TABLE 3

Equal Length Rule Distance Metric - Inputs

| Index | Device A | Device B | Device C |
|---|---|---|---|
| 2 | $\#|R_{A_2}| = 1$ | $\#|R_{B_2}| = 1$ | $\#|R_{C_2}| = 1$ |
| 3 | $\#|R_{A_3}| = 0$ | $\#|R_{B_3}| = 1$ | $\#|R_{C_3}| = 1$ |
| 4 | $\#|R_{A_4}| = 1$ | $\#|R_{B_4}| = 1$ | $\#|R_{C_4}| = 1$ |

Consequently, based on the above inputs to the equal length rule count distance metric, the equal length rule count distance metric associated with each device pair may be calculated according to either of the following two (equivalent) methods:

TABLE 4

Equal Length Rule Distance Metric—Method One

| Device Pair | Calculations | Rule Count Distance Metric |
|---|---|---|
| A → B | $\sum_i \frac{|\#|R_{A_i}| - \#|R_{B_i}||}{\#|R_{A_i}| + \#|R_{B_i}|}$ | $\frac{\Sigma_i \frac{|\#|R_{A_i}| - \#|R_{B_i}||}{\#|R_{A_i}| + \#|R_{B_i}|}}{\max(\#R_A, \#R_B)}$ |
| | $0 + 1 + 0 = 1$ | $\frac{1}{\max(2, 3)} = 0.3333$ |
| A → C | $\sum_i \frac{|\#|R_{A_i}| - \#|R_{C_i}||}{\#|R_{A_i}| + \#|R_{C_i}|}$ | $\frac{\Sigma_i \frac{|\#|R_{A_i}| - \#|R_{C_i}||}{\#|R_{A_i}| + \#|R_{C_i}|}}{\max(\#R_A, \#R_C)}$ |
| | $0 + 1 + 0 = 1$ | $\frac{1}{\max(2, 3)} = 0.3333$ |
| B → C | $\sum_i \frac{|\#|R_{C_i}| - \#|R_{B_i}||}{\#|R_{C_i}| + \#|R_{B_i}|}$ | $\frac{\Sigma_i \frac{|\#|R_{C_i}| - \#|R_{B_i}||}{\#|R_{C_i}| + \#|R_{B_i}|}}{\max(\#R_C, \#R_B)}$ |
| | $0 + 0 + 0 = 0$ | $\frac{0}{\max(3, 3)} = 0.0000$ |

TABLE 5

Equal Length Rule Distance Metric—Method Two

| Device Pair | Calculations | Rule Count Distance Metric |
|---|---|---|
| A → B | $\sum_i \left[1 - 2\frac{\min(\#|R_{A_i}|, \#|R_{B_i}|)}{\#|R_{A_i}| + \#|R_{B_i}|}\right]$ | $\frac{\Sigma_i \left[1 - 2\frac{\min(\#|R_{A_i}|, \#|R_{B_i}|)}{\#|R_{A_i}| + \#|R_{B_i}|}\right]}{\max(\#R_A, \#R_B)}$ |
| | $\left(1 - 2\frac{1}{2}\right) + (1 - 2*0) + \left(1 - 2\frac{1}{2}\right) = 1$ | $\frac{1}{\max(2, 3)} = 0.3333$ |
| A → C | $\sum_i \left[1 - 2\frac{\min(\#|R_{A_i}|, \#|R_{C_i}|)}{\#|R_{A_i}| + \#|R_{C_i}|}\right]$ | $\frac{\Sigma_i \left[1 - 2\frac{\min(\#|R_{A_i}|, \#|R_{C_i}|)}{\#|R_{A_i}| + \#|R_{C_i}|}\right]}{\max(\#R_A, \#R_C)}$ |
| | $\left(1 - 2\frac{1}{2}\right) + (1 - 2*0) + \left(1 - 2\frac{1}{2}\right) = 1$ | $\frac{1}{\max(2, 3)} = 0.3333$ |
| B → C | $\sum_i \left[1 - 2\frac{\min(\#|R_{B_i}|, \#|R_{C_i}|)}{\#|R_{B_i}| + \#|R_{C_i}|}\right]$ | $\frac{\Sigma_i \left[1 - 2\frac{\min(\#|R_{B_i}|, \#|R_{C_i}|)}{\#|R_{B_i}| + \#|R_{C_i}|}\right]}{\max(\#R_B, \#R_C)}$ |
| | $\left(1 - 2\frac{1}{2}\right) + \left(1 - 2\frac{1}{2}\right) + \left(1 - 2\frac{1}{2}\right) = 0$ | $\frac{0}{\max(3, 3)} = 0.0000$ |

In various embodiments, turning now to the grammar distance metrics based on individual (e.g., content-based) rule comparisons, a Hamming distance metric may quantify the semantic similarity between the rules in the grammars 455 associated with a device pair that have an equal length, where the Hamming distance between two equal length strings refers to the number of positions at which the corresponding symbols differ (i.e., the minimum substitutions required to change one string to the other, or the minimum errors that could have transformed one string into the other). In that context, the Hamming distance metric may represent the normalized Hamming distance between equal length rules in the grammars 455 associated with two different devices, which can be calculated according to the following formula, where $R_{A_i}$ denotes the text associated with rule i in the grammar 455 associated with Device A, $|R_{A_i}|$ denotes the length associated with rule i in the grammar 455 associated with Device A, and the Hamming distance metric requires $R_{A_i}$ and $R_{B_j}$ to have the same length:

$$D \propto \frac{\sum_{i}^{max(|R_A|)} \sum_{j}^{max(|R_B|)} \frac{Min\left(Hamming\left(\sum_{k} R_{A_{ik}}, \sum_{l} R_{B_{jl}}\right)\right)}{|R_{A_i}|}}{min(\#R_A, \#R_B)}$$

More particularly, to compute the Hamming distance metric between two rule strings having an equal length, a non-binary exclusive OR (XOR) comparison may be performed between the two symbols at each position within the respective rule strings, wherein a match yields a zero (0) and a mismatch yields a one (1) (e.g., if the first character in each rule string are the same, the XOR comparison between the respective first characters yields a zero value, whereas the XOR comparison between the first characters yields a one value if the first characters in the respective rule strings are different). As such, in various embodiments, the values from the non-binary XOR comparisons that are performed between the symbols at each position in the two equal-length rule strings may be summed and the summed total may then be divided according to the total length associated with the compared rule strings to compute the total Hamming distance between the equal-length rule strings. Furthermore, to compute the overall Hamming distance metric between the grammars associated with a device pair, the total Hamming distances between all equal-length rule strings associated with each device may be summed and then divided according to the minimum number of (flattened) rule strings in the grammars associated with either device. For example, in context with the various rule strings in the grammars 455 associated with Device A, Device B, and Device C mentioned above, the Hamming distance metric associated with each device pair may be calculated as follows:

TABLE 6

Hamming Distance Metric - Initial Calculations

| Device Pair | $(X \rightarrow Y)_i$ Hamming | Length | Distance |
|---|---|---|---|
| A → B | $(A \rightarrow B)_2$ Hamm(ad, ba) = 2 | 2 | 1 |
| | $(A \rightarrow B)_4$ Hamm(adcd, dcda) = 4 | 4 | 1 |
| A → C | $(A \rightarrow C)_2$ Hamm(ad, ab) = 1 | 2 | 0.5 |
| | $(A \rightarrow C)_4$ Hamm(adcd, adcd) = 0 | 4 | 0 |
| B → C | $(B \rightarrow C)_2$ Hamm(ba, ab) = 2 | 2 | 1 |
| | $(B \rightarrow C)_3$ Hamm(dcd, adc) = 3 | 3 | 1 |
| | $(B \rightarrow C)_4$ Hamm(dcda, adcd) = 4 | 4 | 1 |

TABLE 7

Hamming Distance Metric Between Equal Length Rules

| Device Pair | $(X \rightarrow Y)_2$ | $(X \rightarrow Y)_3$ | $(X \rightarrow Y)_4$ | min(#X, #Y) | Hamming Distance |
|---|---|---|---|---|---|
| A → B | 1 | N/A | 1 | min(2, 3) | 1.000 |
| A → C | 0.5 | N/A | 0 | min(2, 3) | 0.250 |
| B → C | 1 | 1 | 1 | min(3, 3) | 1.000 |

In various embodiments, another grammar distance metric that can quantify the semantic similarity between individual rules in the grammars 455 associated with a device pair may comprise a Levenshtein distance metric, where the Levenshtein distance generally measures the difference between two strings with respect to the minimum number of single-character edits (i.e., insertions, deletions, or substitutions) required to change one string to the other. In that context, the Levenshtein distance metric can be calculated according to the following formula, subject to algorithmic constraints where the rule pair having a minimum rule length difference is chosen and no rule is used more than once:

$$D \propto \frac{\sum_{i}^{\#R_A} \sum_{j}^{\#R_B} \frac{Min(Levenshtein(R_{A_i}, R_{B_j}))}{Max(|R_{A_i}|, |R_{B_j}|)}}{min(\#R_A, \#R_B)}$$

Accordingly, given the various rule strings in the grammars 455 associated with Device A, Device B, and Device C, the Hamming distance metric associated with each device pair may be calculated as follows:

```
A₂ : a d         # substitute a with b; substitute d with a
A₂ : b a
B₂ : b a
   two substitutions;
   Levenshtein distance = 2
   rule length difference = 0
A₂ : a d         # insert d prior to a
A₂ : d a d       # substitute a with c
A₂ : d c d
B₃ : d c d
   one insertion; one substitution
   Levenshtein distance = 2
   rule length difference = 1
A₂ : a d         # insert d prior to a
A₂ : d a d       # substitute a with c
A₂ : d c d       # insert a after d
A₂ : d c d a
B₃ : d c d a
   two insertions; one substitution
   Levenshtein distance = 3
   rule length difference = 2
among the three rules in Device B grammar, B2 is closest to A2;
lowest Levenshtein distance = 2
lowest rule length difference = 0
       Max(|R_{A2}|,|R_{B2}|) = max(2,2) = 2
normalized Levenshtein distance for this rule pair = 2/2 = 1
```

Accordingly, because rule $B_2$ has already been matched to rule $A_2$, rule $B_2$ can no longer be used to match to other rules in the grammar 455 associated with Device A. In various embodiments, the above insertion/substitution/deletion procedure may be repeated until an appropriate rule pair has been determined with respect to each rule in the grammar 455 associated with Device A and the normalized Levenshtein distance has been calculated for each rule pair. The total Levenshtein distance can then be calculated as follows and the Levenshtein distance for each device pair is then shown in the following table:

$A_2 \to B_2$ Levenshtein distance=1
$A_4 \to B_3$ Levenshtein distance=¼
min (#$R_A$, #$R_B$)=min(2,3)=2
(1+¼)/2=⅝=0.6250

TABLE 8

Levenshtein Distance Between Rules

| Device Pair | Levenshtein Distance |
|---|---|
| A → B | 0.6250 |
| A → C | 0.2500 |
| B → C | 0.6667 |

In various embodiments, each distance metric calculated with respect to a particular device pair may then be summed to obtain a net distance between the grammars 455 associated with the respective devices, which may be normalized according to how many distance metrics were used. Furthermore, in certain use cases, one or more distance metrics may be deemed more significant than others, in which case the more important distance metrics may be assigned higher weights. However, in the net grammar distance calculations shown below, each distance metric has been assigned equal weight.

TABLE 9

Net Grammar Distance

| Distance Metric | A → B | A → C | B → C |
|---|---|---|---|
| Rule Count | 0.2000 | 0.2000 | 0.0000 |
| Average Rule Length | 0.0000 | 0.0000 | 0.0000 |
| Equal Length Rule Count | 0.3333 | 0.3333 | 0.0000 |
| Hamming Distance | 1.000 | 0.2500 | 1.0000 |
| Levenshtein Distance | 0.6250 | 0.2500 | 0.6667 |
| Net Grammar Distance | 0.4317 | 0.2067 | 0.3333 |

Figure 5:
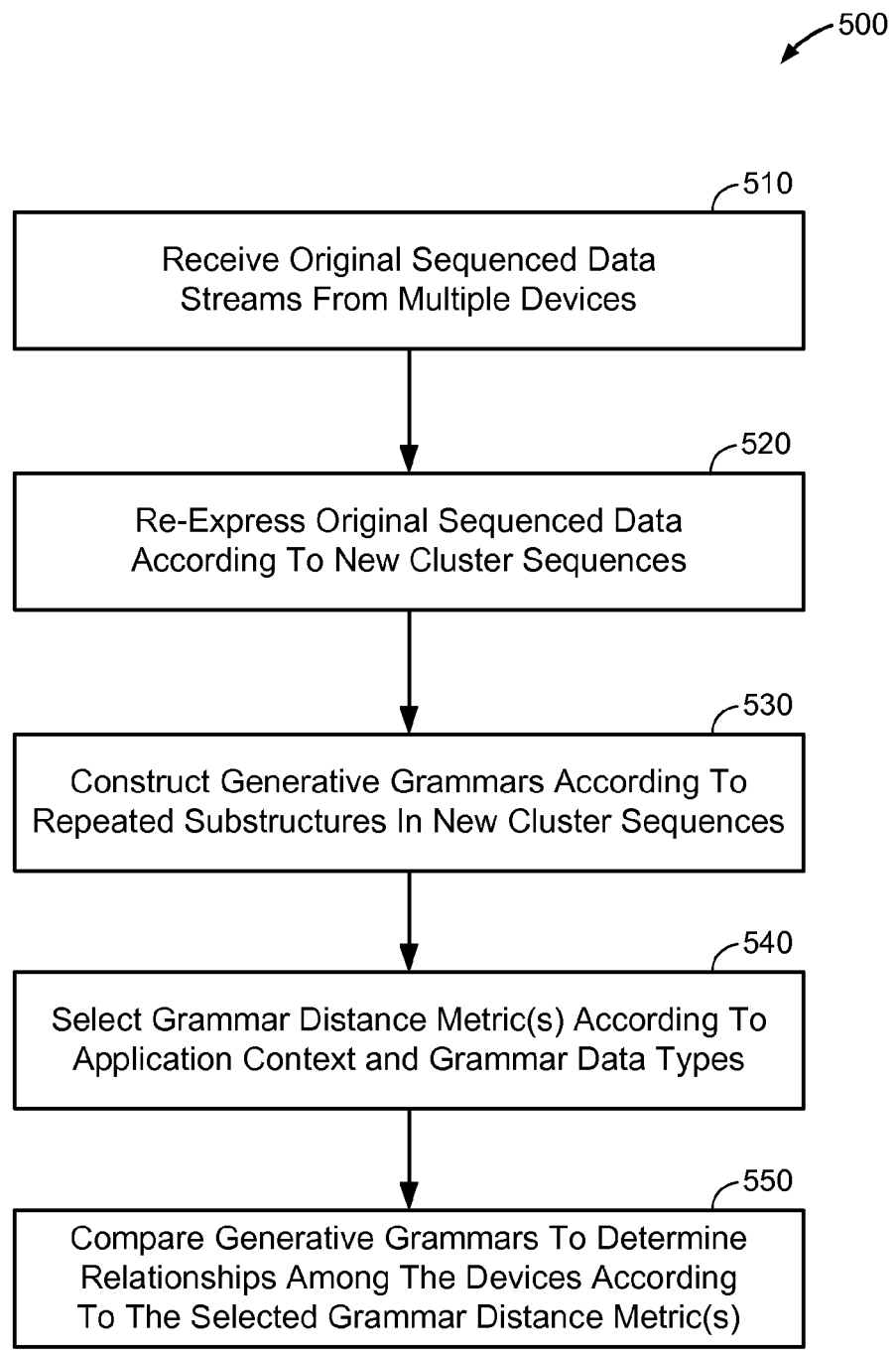
FIG. 5 illustrates an exemplary method in which data streams from multiple devices may be used to construct grammars that can then be analyzed to determine relationships among the devices that generated the data streams based on syntactic and semantic similarities between the grammars, according to various aspects.

According to various aspects, FIG. 5 illustrates an exemplary method 500 in which data streams from multiple devices may be used to construct grammars that can then be analyzed to determine relationships among the devices that generated the data streams based on syntactic and semantic similarities between the grammars. More particularly, at block 510, a server or another suitable processing device may initially receive original data streams from multiple devices and then re-express sequenced data items contained in the original data stream according to a more new cluster sequence at block 520. For example, in various embodiments, re-expressing the original sequenced data items at block 520 may comprise placing each sequenced data item contained in the original data streams into a cluster, wherein the clusters into which the sequenced data items were placed may then be arranged in a sequence to produce the new cluster sequences and a terminal symbol may be assigned to each unique cluster in the new cluster sequence. In various embodiments, at block 530, generative grammars may then be constructed to correspond to the original data streams received from each device, wherein constructing the generative grammars may comprise identifying one or more patterns, structures, sub-patterns, sub-structures, etc. that repeat in the symbol sequence that corresponds to the new cluster sequences used to re-express the original sequenced data items. As such, the generative grammars that are constructed at block 530 may comprise one or more rules to represent the repeating patterns, structures, sub-patterns, sub-structures, etc. among the symbols in the new cluster sequences, and constructing the generative grammars may optionally further comprise creating one or more hierarchical and/or nested rules that reference other rules (if applicable) and flattening each rule such that only terminal symbols remain except that the zeroth rule that represents the original symbol sequence may remain unflattened.

Accordingly, in various embodiments, one or more grammar distance metrics may then be selected at block 540 to quantify similarities between the generative grammars, wherein the particular grammar distance metrics may be selected according to an application context and data types associated with the grammars. For example, in various embodiments, the distance metrics selected at block 540 may quantify syntactic similarities and/or semantic similarities between disparate original data streams, where the selected distance metrics may be tailored according to the particular application context and data types used to form the generative grammars. In general, the distance metrics can be assumed to be commutative or symmetric, meaning that a distance from the grammar associated with a first device to the grammar associated with a second device will be the same as the distance from the grammar associated with the second device to the grammar associated with the first device. Furthermore, each distance metric selected at block 540 may be a normalized L1 norm, which may generally refer to a geometric metric in which the distance between two points is the sum of the absolute differences between the Cartesian coordinates associated therewith (e.g., a Taxicab norm or Manhattan distance), whereby each distance metric may range from zero to one and multiple individual distance metrics may be averaged to determine the total net distance between two grammars.

In various embodiments, the generative grammars associated with a particular device pair may then be compared at block 550 to determine a semantic and/or syntactic relationship among the devices in the pair according to the selected distance metric(s). More particularly, as described in further detail above, the grammar distance metrics may be based on aggregate (e.g., global) rule comparisons rules that can be used to quantify similarities in syntactical form and individual (e.g., content-based) rule comparisons that can be used to quantify similarities in semantic meaning. For example, in various embodiments, the grammar distance metrics that are used to compare the generative grammars at block 550 and thereby quantify the syntactic similarity between the grammars may include a rule count distance metric that compares the total rule count in each grammar. In another example, the syntactic similarity between the grammars can be calculated according to an average rule length distance metric that compares the average rule length in the grammars associated with each device in the pair. In still another example, the syntactic similarity between the grammars can be calculated according to an equal length rule count distance metric based on the number of rules in each grammar that have an equal length. In that sense, the equal length rule count distance metric may differ from the rule count distance metric and the average rule length distance metric in that the equal length rule count metric compares aggregate counts between individual rules, which may quantify a lower-level syntactic similarity between the grammars.

Furthermore, in various embodiments, the grammar distance metrics that are used to compare the generative grammars at block 550 and thereby quantify the semantic similarity between the grammars may include a Hamming distance metric, which may generally represent the normalized Hamming distance between equal length rules in the grammars associated with each device in the device pair. More particularly, to compute the Hamming distance metric and thereby quantify the semantic similarity between two rule strings that have an equal length, a non-binary XOR comparison may be performed between the symbols at each position within the respective rule strings, wherein a match yields a zero (0) and a mismatch yields a one (1). Accordingly, the Hamming distance metric may generally represent the number of positions at which corresponding symbols in the respective equal length rule strings differ from one another, or stated differently, the minimum number of substitutions required to change one string to the other or the minimum number of errors that could have transformed one string into the other. Furthermore, in another example, the semantic similarity between individual rules in the grammars associated with the respective devices may be quantified according to a Levenshtein distance metric, which may generally measure the difference between two strings with respect to the minimum number of single-character edits (i.e., insertions, deletions, or substitutions) required to change one string to the other. For example, calculating the Levenshtein distance metric may comprise identifying a rule pair having a minimum difference in length and determining the minimum number of single-character edits needed to transform one rule into another (subject to a constraint that no rule is used more than once).

In various embodiments, the distance metrics used to compare the generative grammars at block 550 may then be summed to obtain a net distance between the grammars associated with the respective devices, which may be normalized according to how many distance metrics were used. Furthermore, in certain use cases, one or more distance metrics may optionally be deemed more significant than others, in which case the more important distance metrics may be assigned higher weights. In any case, the normalized net distance may then be used to determine a relationship among the devices that generated the original data streams (e.g., whether the devices are semantically similar, syntactically similar, semantic and syntactically similar, etc.).

Figure 6:
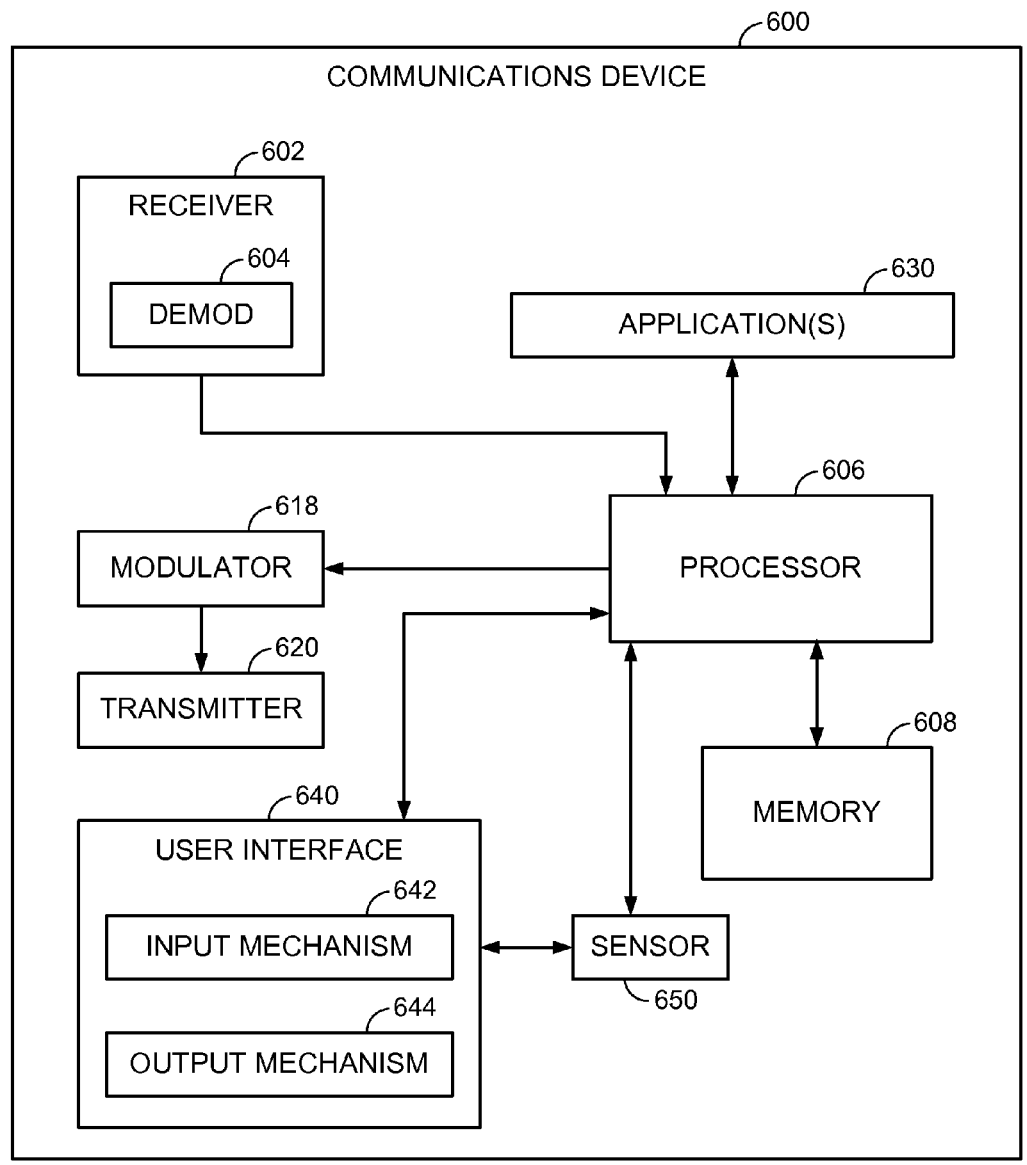
FIG. 6 illustrates an exemplary communication device that may generate a data stream that can be used to construct a grammar that can be compared to grammars associated with other devices to determine relationships among the devices based on syntactic and semantic similarities between the grammars, according to various aspects.

According to various aspects, FIG. 6 illustrates an exemplary communication device 600 that may generate a data stream that can be used to construct a grammar that can be compared to grammars associated with other devices to determine relationships among the devices based on syntactic and semantic similarities between the grammars. In particular, as shown in FIG. 6, the communications device 600 may comprise a receiver 602 that may receive a signal from, for instance, a receive antenna (not shown), perform typical actions on the received signal (e.g., filtering, amplifying, downconverting, etc.), and digitize the conditioned signal to obtain samples. The receiver 602 can comprise a demodulator 604 that can demodulate received symbols and provide them to a processor 606 for channel estimation. The processor 606 can be dedicated to analyzing information received by the receiver 602, generating information that can be modulated by a modulator 618 for transmission by a transmitter 620, controlling one or more components of the communications device 600, and/or any suitable combination thereof.

In various embodiments, the communications device 600 can additionally comprise a memory 608 operatively coupled to the processor 606, wherein the memory 608 can store received data, data to be transmitted, information related to available channels, data associated with analyzed signal and/or interference strength, information related to an assigned channel, power, rate, or the like, and any other suitable information for estimating a channel and communicating via the channel. In various embodiments, the memory 608 can include one or more instructions associated with one or more endpoint applications 630 that may execute on the processor 606. The memory 608 can additionally store protocols and/or algorithms associated with estimating and/or utilizing a channel (e.g., performance based, capacity based, etc.).

Those skilled in the art will appreciate that the memory 608 and/or other data stores described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 in the subject systems and methods may comprise, without being limited to, these and any other suitable types of memory.

Additionally, in various embodiments, the communications device 600 may include a user interface 640, which may include one or more input mechanisms 642 for generating inputs into the communications device 600, and one or more output mechanisms 644 for generating information for consumption by the user of the communications device 600. For example, the input mechanisms 642 may include a mechanism such as a microphone that can be used to receive and/or detect audio inputs, a camera that can capture and/or detect visual inputs, in addition to a key or keyboard, mouse, touch-screen display, etc. that can receive and/or detect other input types. Further, for example, the output mechanisms 644 may include a display, an audio speaker, a haptic feedback mechanism, a Personal Area Network (PAN) transceiver etc. In the illustrated aspects, the output mechanisms 644 may include an audio speaker operable to render media content in an audio form, a display operable to render media content in an image or video format, and/or other suitable output mechanisms.

Furthermore, in various embodiments, the communications device 600 may include one or more sensors 650 that can detect inflicted motion or other suitable metrics that may indicate a usage state associated with the communications device 600. In another example, the one or more sensors 650 may monitor activity associated with the processor 606 to detect the usage state associated with the communications device 600 according to activity that may not be indicated via inflicted motion or other suitable motion metrics.

Accordingly, in various embodiments, the various components associated with the communications device 600 may be used to generate one or more data streams that include one or more sequenced data items representing any number of different operational aspects associated with the communications device. As such, in various embodiments, the data streams may be transmitted (e.g., via the transmitter 620) to an external entity that can re-express the sequenced data items according to one or more sequenced clusters, assign a symbol to each cluster in the sequence, derive a grammar that includes one or more rules to represent repeated patterns, structures, etc. that appear in the symbol sequence, and compare the resulting grammar to a grammar produced from a data stream generated at another device (not shown) according to one or more distance metrics that quantify a semantic and/or similarity between the resulting grammars and thereby classify a relationship between the communications device 600 and the other device.

Figure 7:
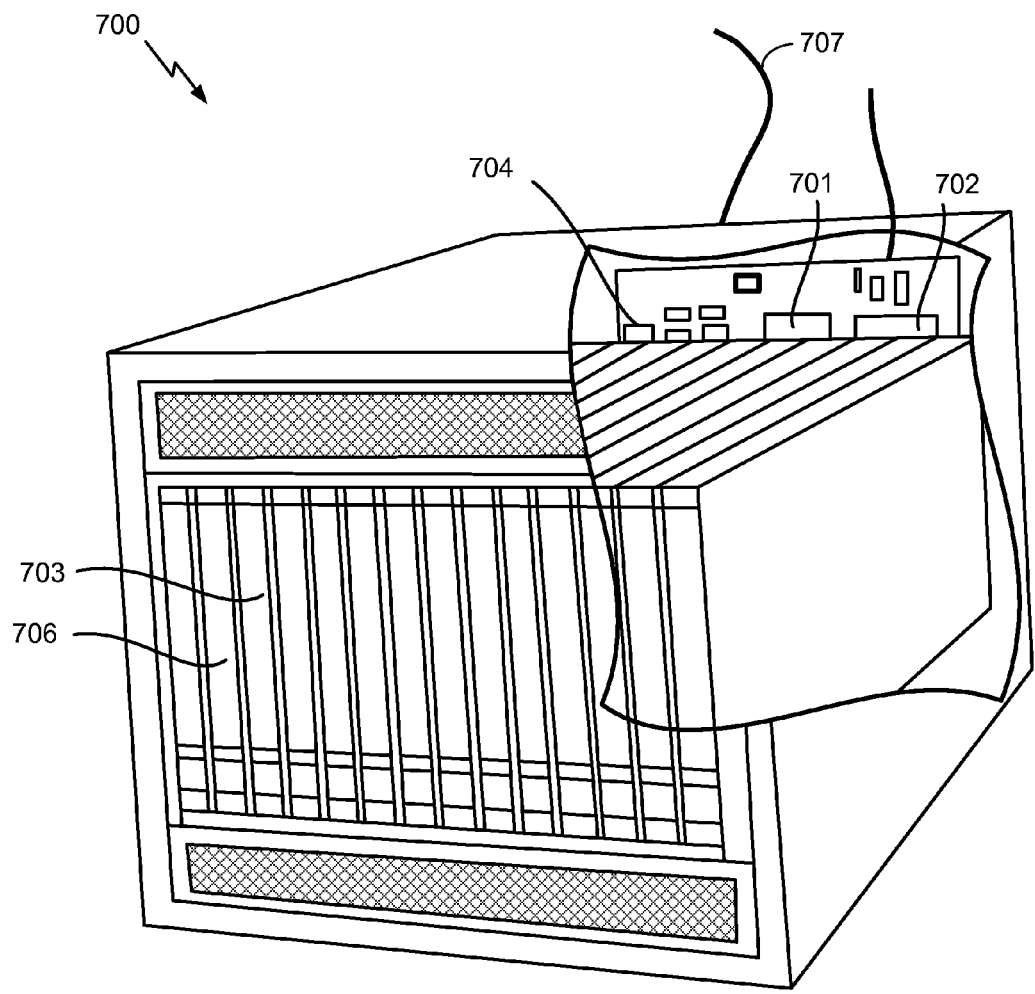
FIG. 7 illustrates an exemplary server that may construct and analyze grammars according to data streams that different devices generate to determine relationships among the devices, according to various aspects.

According to various aspects, FIG. 7 illustrates an exemplary server 700 that may construct and analyze grammars according to data streams that different devices generate to determine relationships among the devices. In various embodiments, the server 700 may comprise a commercially available server device, which may correspond to one example configuration of the server 470 described above in relation to FIG. 4. Accordingly, the server 700 may provide certain functions that can be used to construct grammars that cluster or otherwise re-express original data streams received from various devices, which may then be analyzed to measure syntactic and semantic similarities between the grammars and thereby analyze relationships among the devices that generated the original data streams according to one or more distance metrics that can quantify the closeness between the grammars and thereby provide insight into relationships among the devices that generated the original data streams used to form the resulting grammars. For example, according to various embodiments, the server 700 shown in FIG. 7 includes a processor 701 coupled to volatile memory 702 and a large capacity nonvolatile memory, such as a disk drive 703. The server 700 may also include a floppy disc drive, compact disc (CD) or DVD disc drive 706 coupled to the processor 701. The server 700 may also include network access ports 704 coupled to the processor 701 for establishing data connections with a network 707, such as a local area network coupled to other broadcast system computers and servers or to the Internet. For example, in various embodiments, the server 700 may use the network access points 704 to communicate over the network 707 and thereby receive the original data streams from the devices, which may be stored in any combination of the volatile memory 702, the disk drive 703 and/or the disc drive 706. The processor 701 may then re-express the original data streams according to one or more sequenced clusters, form the resulting generative grammars according to the repeating patterns, structures, etc. that appear in the sequenced clusters, and calculate one or more distance metrics to quantify the semantic and/or syntactic similarity between the devices from which the original data streams were received.

Figure 8:
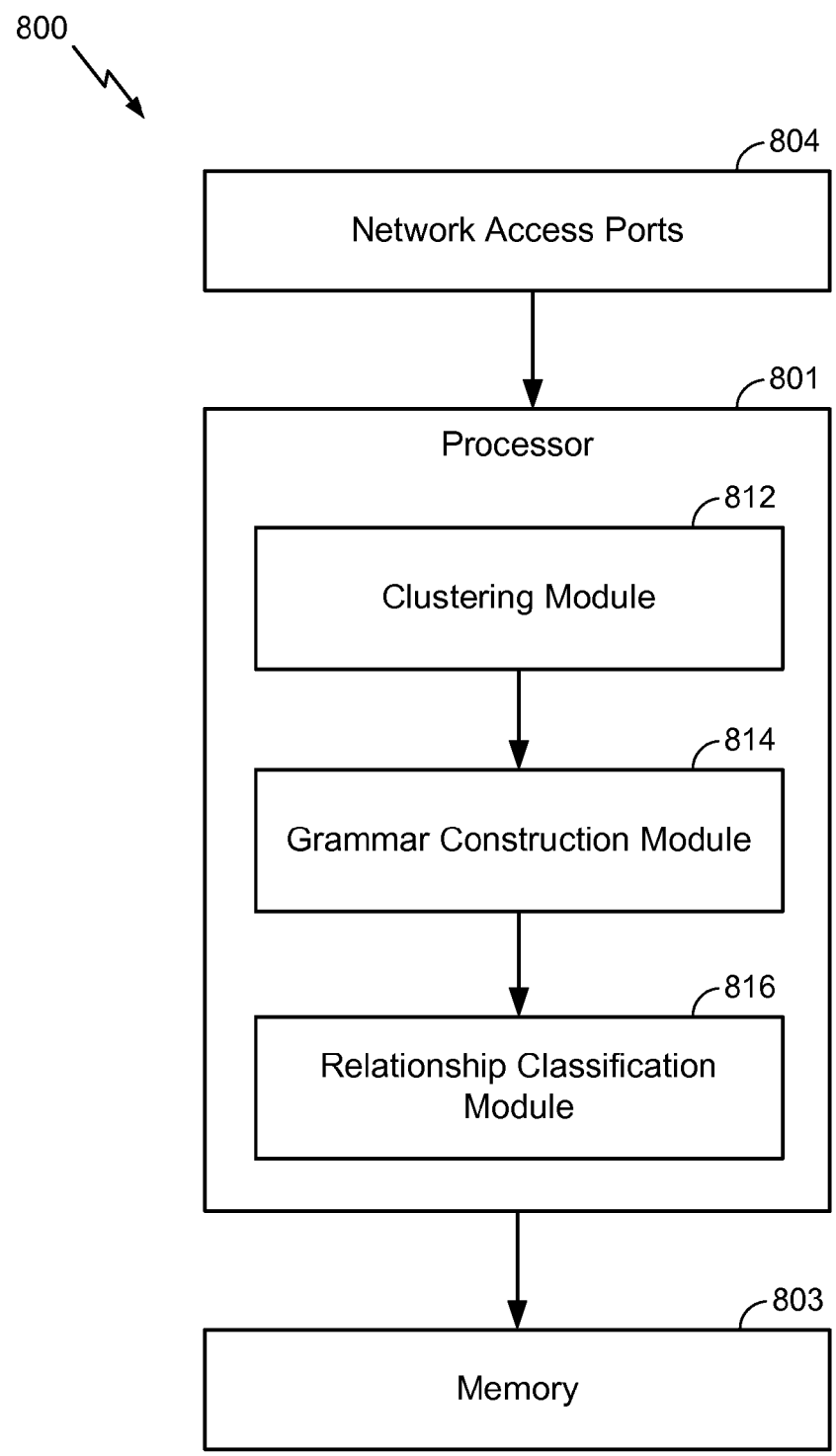
FIG. 8 illustrates an exemplary modular architecture associated with a server that may construct and analyze grammars according to data streams that different devices generate to determine relationships among the devices, according to various aspects.

According to various aspects, FIG. 8 illustrates an exemplary modular architecture associated with a server 800 that may construct and analyze grammars according to data streams that different devices generate to determine relationships among the devices, wherein the server 800 shown in FIG. 8 may correspond to one example configuration of the servers 470, 700 described above in relation to FIG. 4 and FIG. 7.

For example, in various embodiments, the server 800 may include one or more network access ports 804 that can receive original data streams from one or more devices, and the server 800 may comprise a processor 801 having a clustering module 812 that can create one or more clusters from the original data streams and place each sequenced data item contained in the original data streams into a cluster. In various embodiments, the clustering module 812 may then arrange the clusters into a sequence, assign a terminal symbol to each unique cluster, and identify patterns, structures, sub-patterns, sub-structures, etc. that repeat in the symbol sequence that represents the sequenced clusters. As such, the clustering module 812 may then create one or more rules to represent the repeating patterns, structures, sub-patterns, sub-structures, etc. in the symbol sequence, create one or more hierarchical and/or nested rules that reference other rules (if applicable), and flatten each rule such that only terminal symbols remain except that the zeroth rule that represents the original symbol sequence is not flattened.

Accordingly, the processor may further comprise a grammar construction module 814 that may create one or more grammars from the sequenced clusters and the rules created to represent the repeating patterns, structures, sub-patterns, sub-structures, etc. contained therein in addition to a relationship classification module 816 that can compare the resulting grammars according to one or more distance metrics that can quantify the syntactic and/or semantic similarity therebetween. For example, as described in further detail above, the distance metrics may be based on aggregate (e.g., global) rule comparisons rules that can be used to quantify similarities in syntactical form and individual (e.g., content-based) rule comparisons that can be used to quantify similarities in semantic meaning. In that context, the distance metrics that the relationship classification module 816 can calculate to quantify the syntactic similarity between the grammars may include a rule count distance metric that compares the total rule count in each grammar, an average rule length distance metric that compares the average rule length in the grammars associated with each device in the pair, and/or an equal length rule count distance metric based on the number of rules in each grammar that have an equal length. Furthermore, the distance metrics that the relationship classification module 816 can calculate to quantify the semantic similarity between the grammars may include a Hamming distance metric that represents a normalized Hamming distance between equal length rules in the grammars associated with each device in a device pair (e.g., the minimum number of substitutions required to change one string to the other or the minimum number of errors that could have transformed one string into the other) and/or a Levenshtein distance metric that measures the difference between two strings with respect to the minimum number of single-character edits (i.e., insertions, deletions, or substitutions) required to change one string to the other.

In various embodiments, the original data streams received via the network access ports 804, the cluster sequences produced with the clustering module 812, the generative grammars constructed with the grammar construction module 814, and/or the distance metrics calculated with the relationship classification module 816 may be stored in a memory 803. Furthermore, in various embodiments, the server 800 can transmit the resulting cluster sequences, the generative grammars, the calculated distance metrics, and/or the relationships inferred from the distance metrics to the devices that generated the original data streams and/or one or more other devices or servers via the network access ports 804.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a wireless device (e.g., an IoT device). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for measuring similarity between clustered data grammars, comprising:
   receiving, at an apparatus having one or more processors, at least a first data stream from a first device and a second data stream from a second device, wherein the first data stream and the second data stream each include one or more sequenced data items;
   constructing, by the one or more processors, at least a first grammar associated with the first device and a second grammar associated with the second device, wherein the first grammar and the second grammar each comprise a symbol sequence that re-expresses the one or more sequenced data items in the respective data streams received from the first device and the second device;
   calculating, by the one or more processors, one or more distance metrics that quantify a similarity between the first grammar and the second grammar according to a comparison between one or more rules that represent a repeated pattern in the symbol sequence associated with the first grammar and one or more rules that represent a repeated pattern in the symbol sequence associated with the second grammar; and
   determining, by the one or more processors, a relationship between the first device and the second device according to the one or more distance metrics.

2. The method recited in claim 1, wherein the one or more distance metrics include at least one distance metric that quantifies a syntactic similarity between the first grammar and the second grammar.

3. The method recited in claim 2, wherein calculating the at least one distance metric that quantifies the syntactic similarity between the first grammar and the second grammar comprises comparing total rule counts in the first grammar and the second grammar.

4. The method recited in claim 2, wherein calculating the at least one distance metric that quantifies the syntactic similarity between the first grammar and the second grammar comprises comparing average rule lengths in the first grammar and the second grammar.

5. The method recited in claim 2, wherein calculating the at least one distance metric that quantifies the syntactic similarity between the first grammar and the second grammar comprises comparing total rule counts in the first grammar and the second grammar that have an equal length.

6. The method recited in claim 1, wherein the one or more distance metrics include at least one distance metric that quantifies a semantic similarity between individual rules in the first grammar and individual rules in the second grammar.

7. The method recited in claim 6, wherein calculating the at least one distance metric that quantifies the semantic similarity between the individual rules in the first grammar and the individual rules in the second grammar comprises calculating a normalized Hamming distance between the individual rules in the first grammar and the individual rules in the second grammar that have an equal length.

8. The method recited in claim 6, wherein calculating the at least one distance metric that quantifies the semantic similarity between the individual rules in the first grammar and the individual rules in the second grammar comprises:
identifying a rule pair that comprises a first rule in the first grammar and a second rule in the second grammar having a minimum difference in length; and
calculating a normalized Levenshtein distance between the first rule in the first grammar and the second rule in the second grammar.

9. The method recited in claim 1, wherein the one or more distance metrics include an integer score that indicates a nesting level associated with the one or more rules in the first grammar and the one or more rules in the second grammar.

10. The method recited in claim 1, wherein the one or more distance metrics include a binary classification that indicates whether the first grammar and the second grammar are context-free or contextual according to whether one or more symbols that surround the one or more rules in the symbol sequence associated with the first grammar and the second grammar influence the one or more surrounded rules.

11. The method recited in claim 1, further comprising:
summing the one or more calculated distance metrics; and
calculating a net distance that quantifies the similarity between the first grammar and the second grammar, wherein calculating the net distance comprises normalizing the one or more summed distance metrics according to how many distance metrics are included among the summed distance metrics.

12. The method recited in claim 11, wherein calculating the net distance further comprises assigning weights to one or more of the summed distance metrics.

13. An apparatus for measuring similarity between clustered data grammars, comprising:
means for receiving at least a first data stream from a first device and a second data stream from a second device, wherein the first data stream and the second data stream each include one or more sequenced data items;
means for constructing at least a first grammar associated with the first device and a second grammar associated with the second device, wherein the first grammar and the second grammar each comprise a symbol sequence that re-expresses the one or more sequenced data items in the respective data streams received from the first device and the second device;
means for comparing one or more rules that represent a repeated pattern in the symbol sequence associated with the first grammar and one or more rules that represent a repeated pattern in the symbol sequence associated with the second grammar to calculate one or more distance metrics that quantify a similarity between the first grammar and the second grammar; and
means for determining a relationship between the first device and the second device according to the one or more distance metrics.

14. The apparatus recited in claim 13, wherein the one or more distance metrics include at least one distance metric that quantifies a syntactic similarity between the first grammar and the second grammar.

15. The apparatus recited in claim 14, further comprising:
means for calculating the at least one distance metric that quantifies the syntactic similarity between the first grammar and the second grammar according to a comparison between total rule counts in the first grammar and the second grammar.

16. The apparatus recited in claim 14, further comprising:
means for calculating the at least one distance metric that quantifies the syntactic similarity between the first grammar and the second grammar according to a comparison between average rule lengths in the first grammar and the second grammar.

17. The apparatus recited in claim 14, further comprising:
means for calculating the at least one distance metric that quantifies the syntactic similarity between the first grammar and the second grammar comprises according to a comparison between total rule counts in the first grammar and the second grammar that have an equal length.

18. The apparatus recited in claim 13, wherein the one or more distance metrics include at least one distance metric that quantifies a semantic similarity between individual rules in the first grammar and individual rules in the second grammar.

19. The apparatus recited in claim 18, further comprising:
means for calculating the at least one distance metric that quantifies the semantic similarity between the individual rules in the first grammar and the individual rules in the second grammar according to a normalized Hamming distance between the individual rules in the first grammar and the individual rules in the second grammar that have an equal length.

20. The apparatus recited in claim 18, further comprising:
means for calculating the at least one distance metric that quantifies the semantic similarity between the individual rules in the first grammar and the individual rules in the second grammar according to a normalized Levenshtein distance between a first rule in the first grammar and a second rule in the second grammar that have a minimum difference in length.

21. The apparatus recited in claim 13, wherein the one or more distance metrics include an integer score that indicates a nesting level associated with the one or more rules in the first grammar and the one or more rules in the second grammar.

22. The apparatus recited in claim 13, wherein the one or more distance metrics include a binary classification that indicates whether the first grammar and the second grammar are context-free or contextual according to whether one or more symbols that surround the one or more rules in the symbol sequence associated with the first grammar and the second grammar influence the one or more surrounded rules.

23. The apparatus recited in claim 13, further comprising:
means for summing the one or more calculated distance metrics; and
means for calculating a net distance that quantifies the similarity between the first grammar and the second grammar, wherein the calculated the net distance normalizes the one or more summed distance metrics according to how many distance metrics are included among the summed distance metrics.

24. The apparatus recited in claim 23, wherein the means for calculating the net distance further comprises means for assigning weights to one or more of the summed distance metrics.

25. An apparatus, comprising:
one or more network access ports configured to receive at least a first data stream from a first device and a second data stream from a second device, wherein the first data stream and the second data stream each include one or more sequenced data items;
one or more processors configured to:
construct a first grammar associated with the first device and a second grammar associated with the second device, wherein the first grammar and the second grammar each comprise a symbol sequence that re-expresses the one or more sequenced data items in the respective data streams received from the first device and the second device;
calculate one or more distance metrics that quantify a similarity between the first grammar and the second grammar according to a comparison between one or more rules that represent a repeated pattern in the symbol sequence associated with the first grammar and one or more rules that represent a repeated pattern in the symbol sequence associated with the second grammar; and
determine a relationship between the first device and the second device according to the one or more distance metrics.

26. The apparatus recited in claim 25, wherein the one or more distance metrics include at least one distance metric that quantifies a syntactic similarity between the first grammar and the second grammar.

27. The apparatus recited in claim 25, wherein the one or more distance metrics include at least one distance metric that quantifies a semantic similarity between individual rules in the first grammar and the second grammar.

28. A computer-readable storage medium having computer-executable instructions recorded thereon, wherein executing the computer-executable instructions on one or more processors causes the one or more processors to:
receive at least a first data stream from a first device and a second data stream from a second device, wherein the first data stream and the second data stream each include one or more sequenced data items;
construct at least a first grammar associated with the first device and a second grammar associated with the second device, wherein the first grammar and the second grammar each comprise a symbol sequence that re-expresses the one or more sequenced data items in the respective data streams received from the first device and the second device;
calculate one or more distance metrics that quantify a similarity between the first grammar and the second grammar according to a comparison between one or more rules that represent a repeated pattern in the symbol sequence associated with the first grammar and one or more rules that represent a repeated pattern in the symbol sequence associated with the second grammar; and
determine a relationship between the first device and the second device according to the one or more distance metrics.

29. The computer-readable storage medium recited in claim 28, wherein the one or more distance metrics include at least one distance metric that quantifies a syntactic similarity between the first grammar and the second grammar.

30. The computer-readable storage medium recited in claim 28, wherein the one or more distance metrics include at least one distance metric that quantifies a semantic similarity between individual rules in the first grammar and the second grammar.

* * * * *